US011935449B2

(12) United States Patent
Saito et al.

(10) Patent No.: US 11,935,449 B2
(45) Date of Patent: Mar. 19, 2024

(54) INFORMATION PROCESSING APPARATUS AND INFORMATION PROCESSING METHOD

(71) Applicant: SONY CORPORATION, Tokyo (JP)

(72) Inventors: Mari Saito, Kanagawa (JP); Ayumi Nakagawa, Kanagawa (JP); Shingo Utsuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 302 days.

(21) Appl. No.: 16/960,680

(22) PCT Filed: Oct. 18, 2018

(86) PCT No.: PCT/JP2018/038757
§ 371 (c)(1),
(2) Date: Jul. 8, 2020

(87) PCT Pub. No.: WO2019/142420
PCT Pub. Date: Jul. 25, 2019

(65) Prior Publication Data
US 2020/0357321 A1 Nov. 12, 2020

(30) Foreign Application Priority Data
Jan. 22, 2018 (JP) .................................. 2018-007857

(51) Int. Cl.
*G09G 3/20* (2006.01)
*G06F 3/16* (2006.01)
*G10L 15/22* (2006.01)
(52) U.S. Cl.
CPC ............... *G09G 3/20* (2013.01); *G06F 3/167* (2013.01); *G10L 15/22* (2013.01); *G09G 2354/00* (2013.01)

(58) Field of Classification Search
CPC .... G06F 3/04842; G06F 3/011; G06F 3/0304; G06F 3/0482; G06F 3/04817;
(Continued)

(56) References Cited

U.S. PATENT DOCUMENTS 8,943,411 B1* 1/2015 Hill ..................... G06F 3/04886
715/728
9,274,744 B2* 3/2016 Hart ....................... G06F 1/1686
(Continued)

FOREIGN PATENT DOCUMENTS

CN 107408027 A 11/2017
EP 3279790 A1 2/2018
(Continued)

OTHER PUBLICATIONS

International Search Report and Written Opinion of PCT Application No. PCT/JP2018/038757, dated Dec. 18, 2018, 10 pages of ISRWO.

*Primary Examiner* — Christopher E Leiby
(74) *Attorney, Agent, or Firm* — CHIP LAW GROUP

(57) ABSTRACT

Provided is an information processing apparatus including an output control unit that controls an output based on a result of recognition processing for a user input. Further, in a situation where a plurality of users is present, the output control unit dynamically controls, for each of the users, an output of an executability state of the recognition processing for the user input. Furthermore, provided is an information processing method including, by a processor, controlling an output based on a result of recognition processing for a user input. The controlling further including, in a situation where a plurality of users is present, dynamically controlling, for each of the users, an output of an executability state of the recognition processing for the user input.

19 Claims, 23 Drawing Sheets

(58) Field of Classification Search
CPC .................. G06F 3/167; G06F 1/1605; G06F 2203/04801; G06F 2203/0382; G06F 2203/04803; G10L 15/22; G10L 17/00; H04L 67/142; G09G 3/20; G09G 2354/00
See application file for complete search history.

(56) References Cited

U.S. PATENT DOCUMENTS

| | | | |
|---|---|---|---|
| 2002/0052913 | A1 | 5/2002 | Yamada et al. |
| 2010/0007796 | A1* | 1/2010 | Yamaji ............... H04N 21/4312 348/588 |
| 2011/0197263 | A1* | 8/2011 | Stinson, III ............ G06F 3/017 715/753 |
| 2012/0268372 | A1* | 10/2012 | Park ..................... G06F 3/0304 345/158 |
| 2015/0062007 | A1* | 3/2015 | Itoh ..................... H04N 13/305 345/156 |
| 2016/0259522 | A1* | 9/2016 | Gonzalez ............. H04L 65/403 |
| 2016/0349855 | A1* | 12/2016 | Zhu ....................... G09G 3/002 |
| 2017/0351367 | A1* | 12/2017 | Popovich ................ G10L 15/26 |
| 2018/0074785 | A1 | 3/2018 | Ohmura |
| 2018/0196503 | A1* | 7/2018 | Ikeda .................... G06V 40/28 |
| 2019/0095696 | A1* | 3/2019 | Shen ........................ G06T 7/80 |
| 2020/0074961 | A1* | 3/2020 | Yu .......................... G09G 5/377 |
| 2020/0389691 | A1* | 12/2020 | Yoshizawa ......... H04N 21/4223 |

FOREIGN PATENT DOCUMENTS

| | | |
|---|---|---|
| JP | 2002-082748 A | 3/2002 |
| JP | 2005-100382 A | 4/2005 |
| JP | 2005-100420 A | 4/2005 |
| WO | 2016/157662 A1 | 10/2016 |

\* cited by examiner

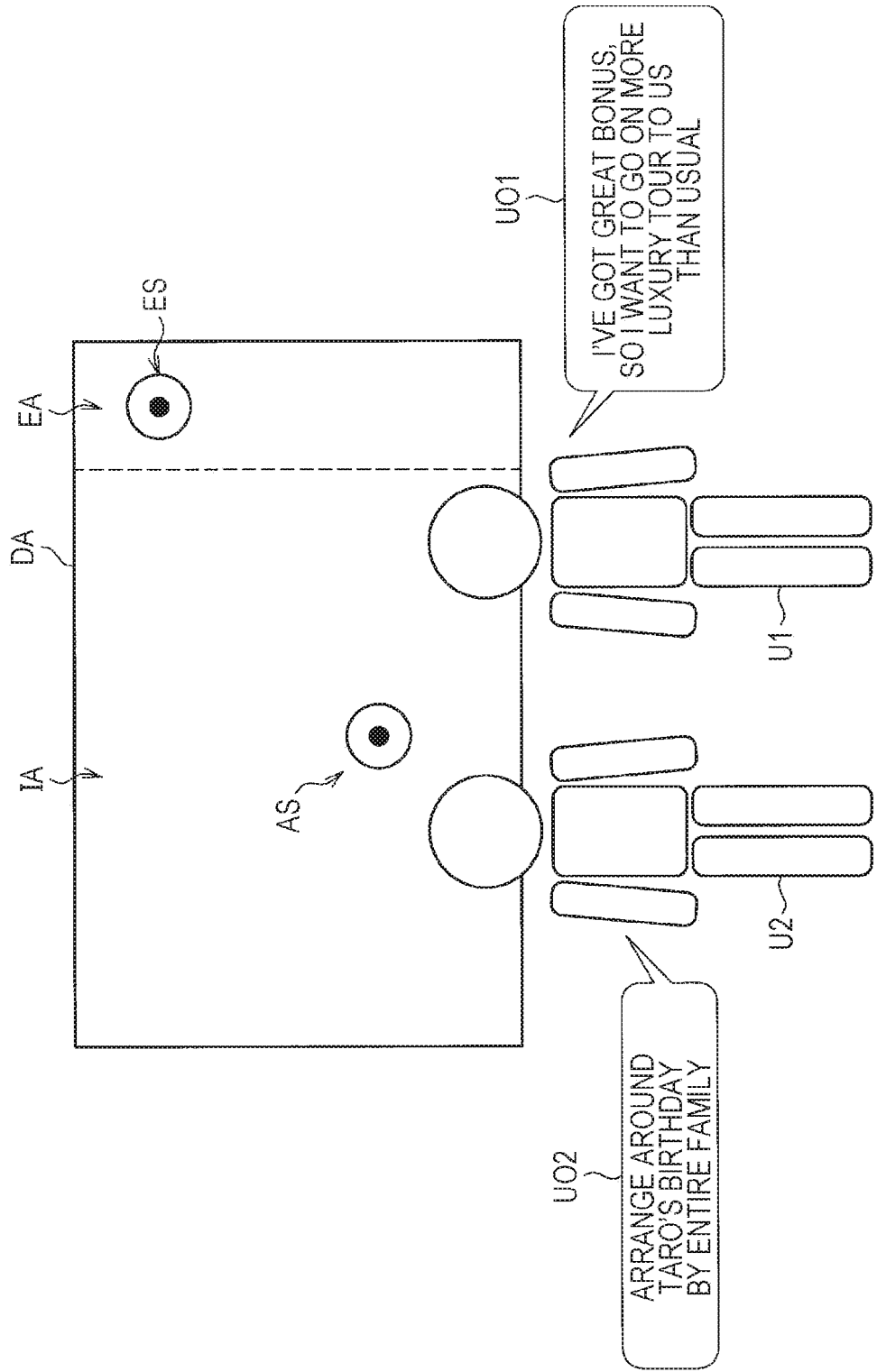

FIG. 12B
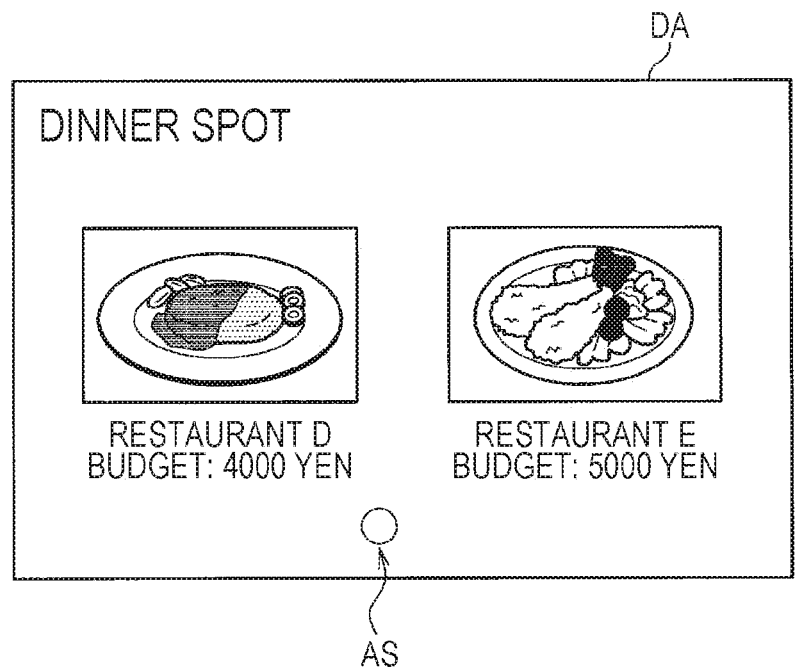
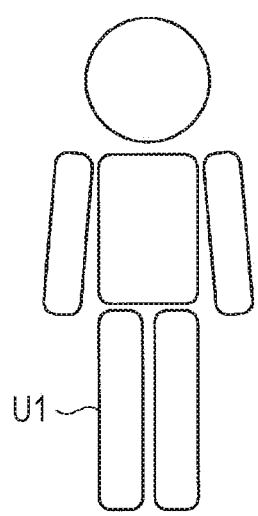

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/038757 filed on Oct. 18, 2018, which claims priority benefit of Japanese Patent Application No. JP 2018-007857 filed in the Japan Patent Office on Jan. 22, 2018. Each of the above-referenced applications is hereby incorporated herein by reference in its entirety.

TECHNICAL FIELD

The present disclosure relates to an information processing apparatus and an information processing method.

BACKGROUND ART

In recent years, with the development of information processing technologies, scenes where a plurality of users uses the same system at the same time are increasing. For example, Patent Document 1 discloses a technology for implementing a sound call among a plurality of users in a computer session and displaying visual information for identifying a speaker. According to the technology described in Patent Document 1, a listener can visually recognize the presence and state of a plurality of speakers who is likely to be present and can set availability of a sound call for each of the speakers, for example.

CITATION LIST

Patent Document

Patent Document 1: Japanese Patent Application Laid-Open No. 2005-100420

SUMMARY OF THE INVENTION

Problems to be Solved by the Invention

Meanwhile, as described in Patent Document 1, in a case of a system for enabling a plurality of users to simultaneously perform input, the number of users who can simultaneously perform input is assumed to be limited from the viewpoint of processing capacity and specifications. For example, in sound recognition processing, a possibility of occurrence of a malfunction becomes high in a case of maintaining a sound recognizable state on a steady basis. Furthermore, in a case of a state where utterances of all of users present in a place are acceptable in a case of providing the sound recognition processing to a certain user, a possibility of a malfunction becomes high due to an utterance of a person who is having a conversation irrelevant to an interaction with the system. Therefore, limitation of the number of uses who can simultaneously perform sound input is important. Furthermore, even in a case where there is no such limitation on the simultaneous input, presentation to each user of a state regarding executability of processing for user input is important in a system where the executability is dynamically switched.

Therefore, the present disclosure proposes new and improved information processing apparatus and information processing method that can make each of a plurality of users clearly perceive input acceptability.

Solutions to Problems

According to the present disclosure, provided is an information processing apparatus including an output control unit configured to control an output based on a result of recognition processing for a user input, in which, in a situation where a plurality of users is present, the output control unit dynamically controls, for each of the users, an output of an executability state of the recognition processing for the user input.

Furthermore, according to the present disclosure, provided is an information processing method including, by a processor, controlling an output based on a result of recognition processing for a user input, the controlling further including, in a situation where a plurality of users is present, dynamically controlling, for each of the users, an output of an executability state of the recognition processing for the user input.

Effects of the Invention

As described above, according to the present disclosure, it is possible to make each of a plurality of users clearly perceive input acceptability.

Note that the above-described effect is not necessarily limited, and any of effects described in the present specification or other effects that can be grasped from the present specification may be exerted in addition to or in place of the above-described effect.

BRIEF DESCRIPTION OF DRAWINGS

FIG. 9A is a diagram for describing display control of an external symbol by the output control unit according to the embodiment.

FIG. 12B is a diagram for describing a variation of output expression by the output control unit according to the embodiment.

MODE FOR CARRYING OUT THE INVENTION

A favorable embodiment of the present disclosure will be described in detail with reference to the appended drawings. Note that, in the present specification and drawings, redundant description of configuration elements having substantially the same functional configuration is omitted by providing the same sign.

Note that the description will be given in the following order.

1. Embodiment
1.1. Overview
1.2. System Configuration Example
1.3. Functional Configuration Example of Information Processing Terminal 10
1.4. Functional Configuration Example of Information Processing Server 20
1.5. Specific Example of Output Control
1.6. Flow of Operation
2. Hardware Configuration Example
3. Conclusion <1. Embodiment>
<<1.1. Overview>>

First, an overview of an embodiment of the present disclosure will be described. As described above, in recent years, there are many devices that allow simultaneous use by a plurality of users. Examples of the above-described devices include an agent device that accepts an input from a user and outputs a response to the input at a home, a workplace, or the like. The agent device can output an answer using sound, visual information, or the like to a question input by the user using an utterance or can provide a function corresponding to a user's request, for example.

At this time, many agent devices do not accept an utterance of a user on a steady basis but transition to a state of accepting an utterance only in a case of detecting a predetermined activation word, thereby preventing a malfunction caused by an utterance of a user who does not intend an input to the devices (for example, a conversation between users or the like).

Meanwhile, inputting an activation word for each question or request is complicated for the user. Therefore, in a case where the agent device has transitioned to the utterance acceptance state by the activation word, it is assumed to continue the acceptance state for a certain time and to successively execute processing for a plurality of utterances by the user. Note that, in the present disclosure, the utterance acceptance state, that is, a state where an utterance of a user is recognized and processing based on the recognition is executable, is expressed as a session regarding an interaction between the user and the device being open.

According to the above-described processing, continuing the state where a session is open by a single activation word allows user's successive utterances and enables significant reduction in complexity regarding an input of an activation word.

Figure 1A:
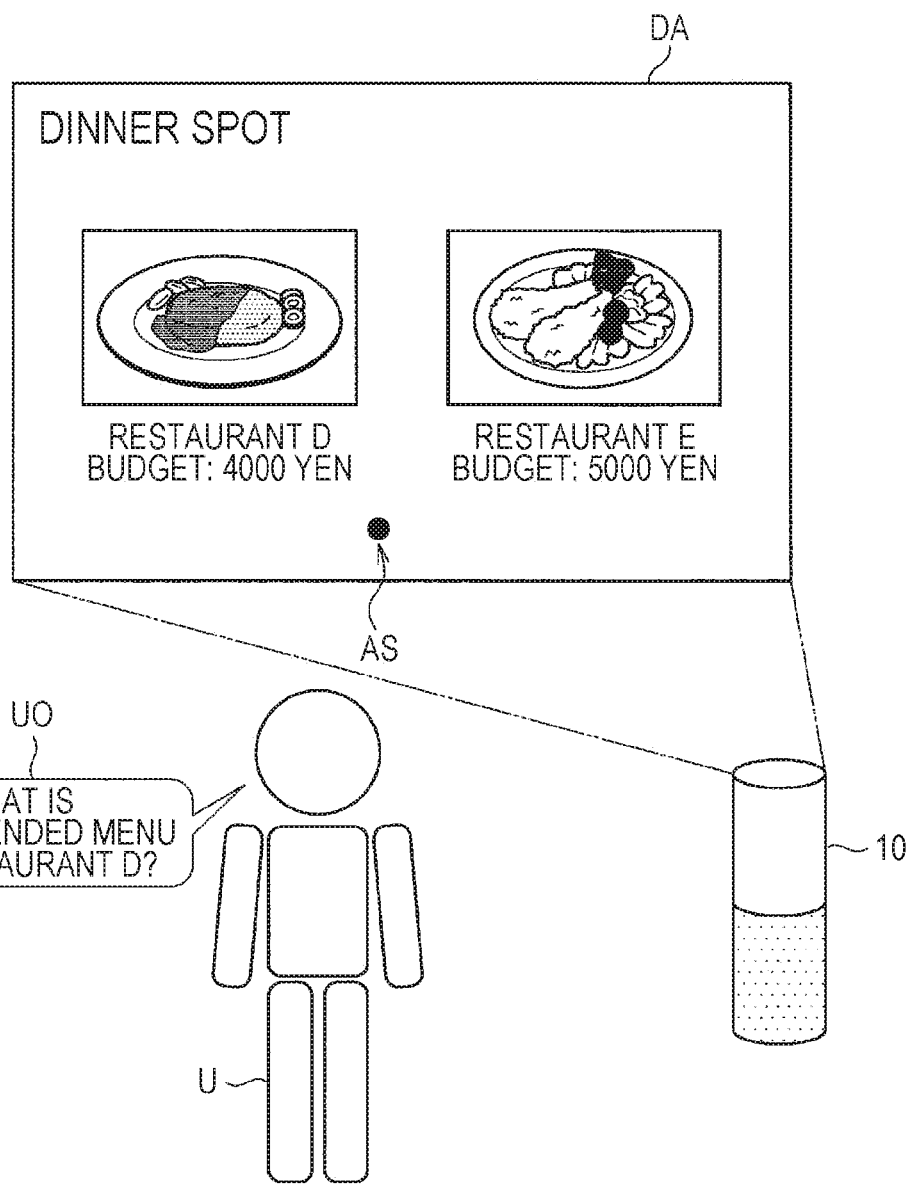
FIG. 1A is a diagram for describing display of a session state according to an embodiment of the present disclosure.
Figure 1B:
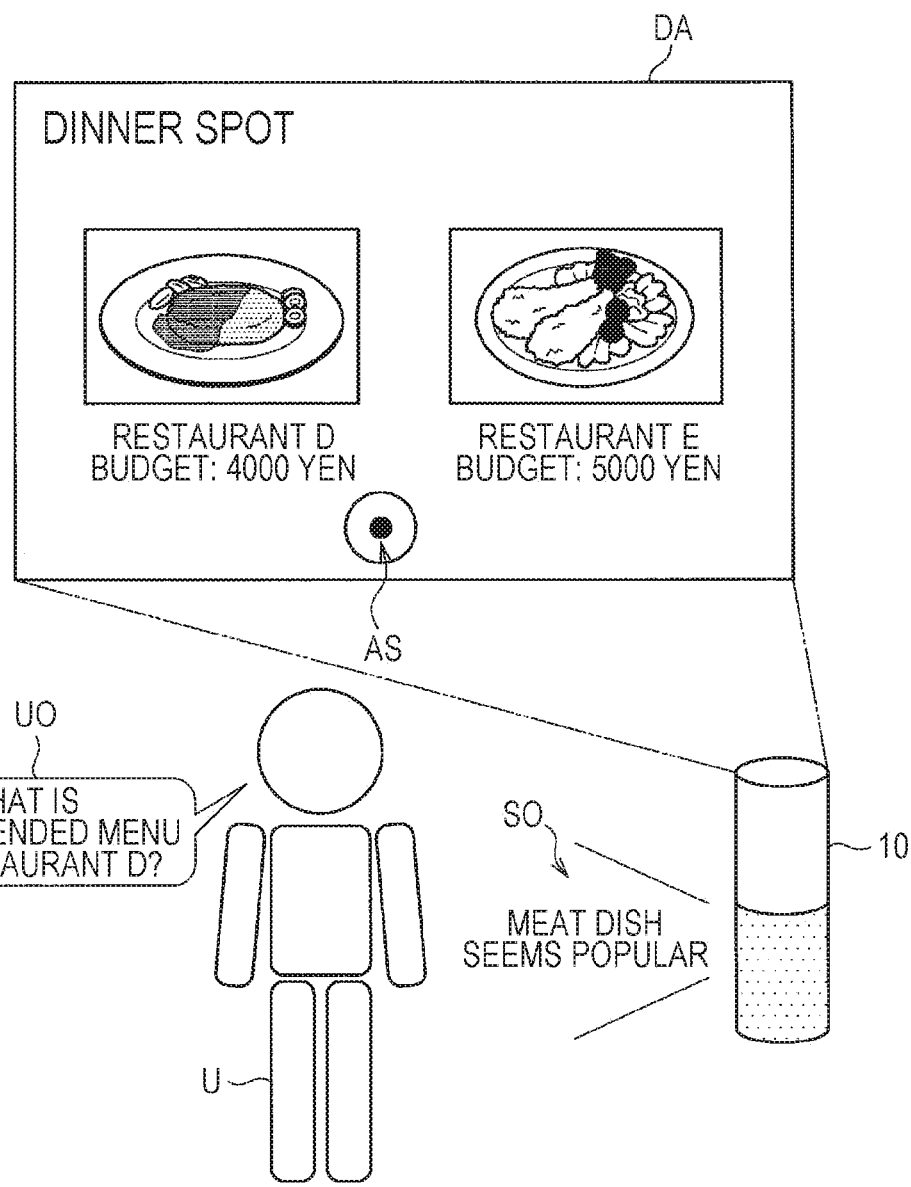
FIG. 1B is a diagram for describing display of a session state according to an embodiment of the present disclosure.

However, in this case, presentation of the state regarding continuation of a session (hereinafter simply referred to as a session state) to the user is important. FIGS. 1A and 1B are diagrams for describing display of a session state according to an embodiment of the present disclosure.

FIG. 1A illustrates an example of an information output by a comparative terminal 90 in the present embodiment. Furthermore, FIG. 1B illustrates an example of an information output by an information processing terminal 10 according to the present embodiment. The comparative terminal 90 and the information processing terminal 10 have a function to recognize an utterance UO of a user U and output a response based on a result of the recognition by image projection by projection.

FIGS. 1A and 1B illustrate examples of a case where information regarding dinner spots is presented in a display area DA output by the comparative terminal 90 or the information processing terminal 10. Furthermore, the comparative terminal 90 and the information processing terminal 10 may display a symbol AS corresponding to an agent function to interact with the user U on the display area DA. The symbol AS is a visual expression for substantiating the agent function in the display area DA, and the user U can pose various utterances to the symbol AS and enjoy a provision function to the utterances.

Note that FIG. 1A illustrates an example of a case where the comparative terminal 90 does not perform presentation regarding the session state. In this case, since the user U cannot perceive whether the session is open or the session is disconnected, the user U is assumed to try to input the utterance UO without an activation word even in the case where the session is actually disconnected. In this case, as illustrated in FIG. 1A, the comparative terminal 90 does not execute recognition processing for the utterance UO, and thus does not execute response processing based on the recognition processing.

Meanwhile, FIG. 1B illustrates an example of a case where the information processing terminal 10 according to the present embodiment performs presentation regarding the session state. In the example illustrated in FIG. 1B, the information processing terminal 10 outputs additional information AI indicating that the session is open to around a sphere representing a center of the symbol AS. According to the above-described expression by the information processing terminal 10 of the present embodiment, the user U can grasp that the session is open by visually recognizing the additional information AI and can input the utterance UO without an activation word, and the information processing terminal 10 can output a sound utterance SO corresponding to an answer to the utterance UO.

As described above, the information processing terminal 10 according to the present embodiment can cause the user to intuitively perceive whether or not the session is open and to determine necessity of an activation word immediately before an utterance by displaying the session state.

Meanwhile, in a case where a plurality of users uses the device at the same time, it is assumed to set a plurality of sessions for the respective users and to control interactions. In this case, presenting the session state to each user is important.

Figure 2:
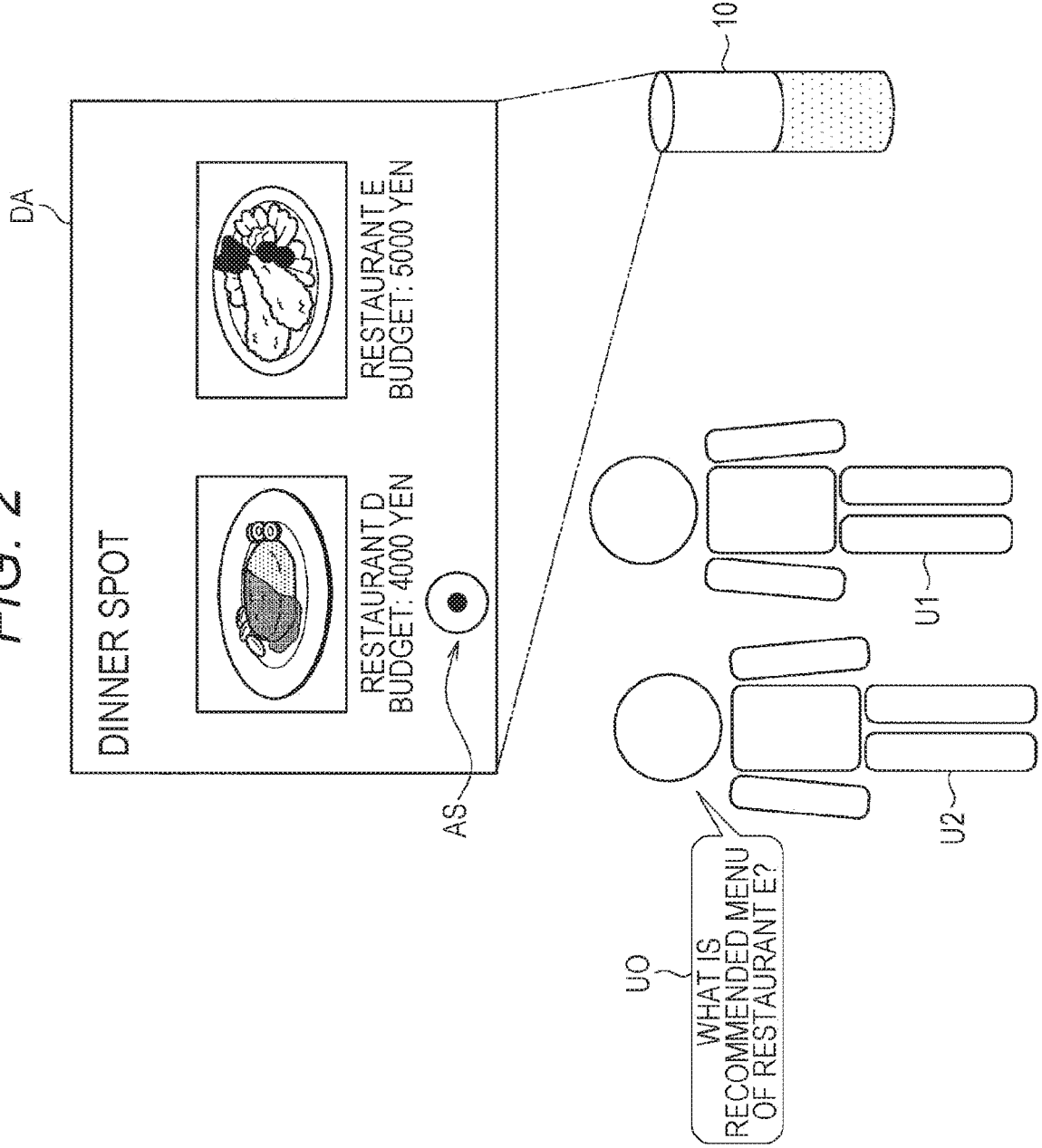
FIG. 2 illustrates an example of a case in which a comparative terminal according to the embodiment commonly presents a session state to a plurality of users.

FIG. 2 illustrates an example of a case where the comparative terminal 90 according to the present embodiment commonly presents the session state to a plurality of users. FIG. 2 illustrates an example of a case where the session is open for a user U1 but the session is not open for a user U2. At this time, since the session is open for the user U1, the comparative terminal 90 displays the additional information AI indicating the state of the session.

Furthermore, the user U2 that has visually recognized the additional information AI erroneously recognizes that the session is open for the user U2 and performs the utterance UO. However, since the session is not actually open for the user U2, the comparative terminal 90 does not execute the recognition processing for the utterance UO and does not execute the response processing based on the recognition processing.

The technical concept according to the present disclosure has been conceived by focusing on the above points, and enables each of a plurality of users to clearly perceive input acceptability. Therefore, the information processing apparatus according to the embodiment of the present invention is characterized in dynamically controlling, for each user, an output of an executability state of recognition processing for a user input in a situation where a plurality of users is present.

Figure 3:
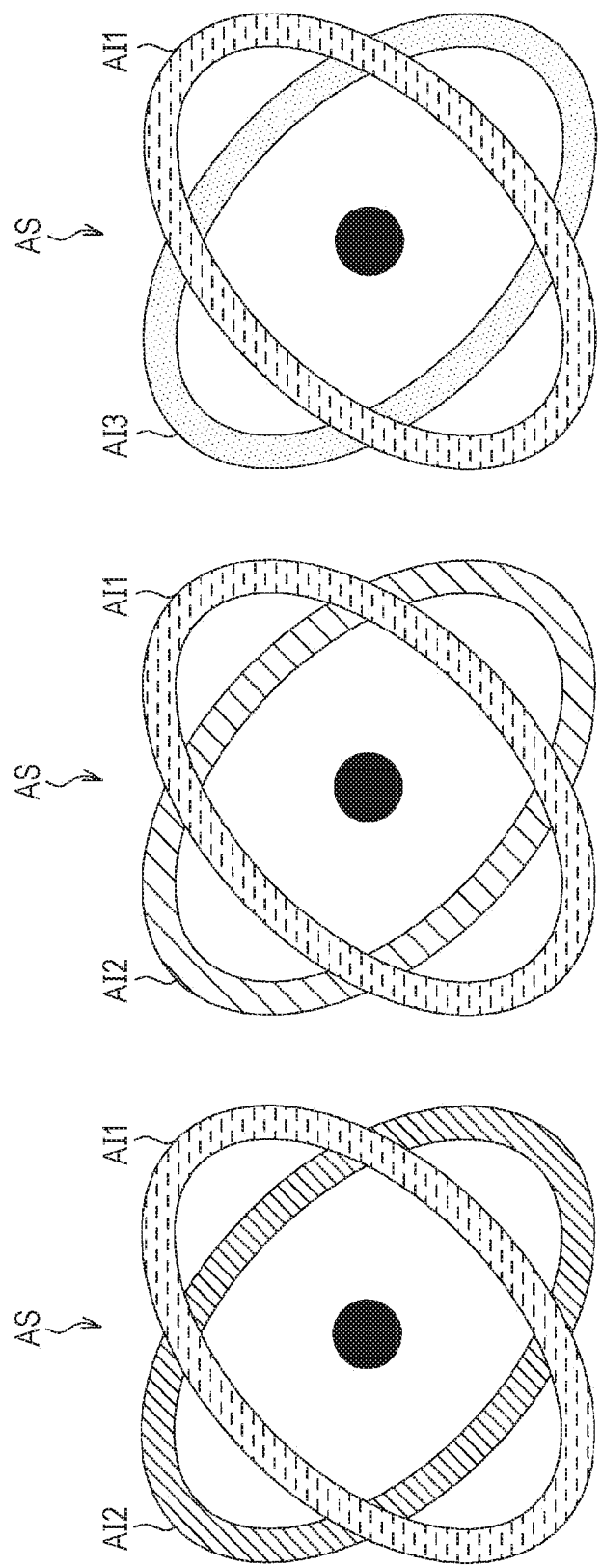
FIG. 3 illustrates an example of additional information output by an information processing terminal according to the embodiment.

FIG. 3 illustrates an example of the additional information output by the information processing terminal 10 according to the present embodiment. For example, the left in FIG. 3 illustrates an example of the additional information output in a case where the two users U1 and U2 who are individually identified are present and the session is open for both of the users.

In this case, the information processing terminal 10 may display two pieces of additional information AI1 and AI2 respectively corresponding to the user U1 and the user U2. Furthermore, at this time, the information processing terminal 10 may display that the user U1 and the user U2 are identified, using a color, a pattern, or the like of the additional information. In the case of the example illustrated in the left in FIG. 3, the information processing terminal 10 uses different patterns for the additional information AI1 corresponding to the user U1 and for the additional information AI2 corresponding to the user U2. At this time, the information processing terminal 10 may use a color or a pattern preset for each user.

Moreover, the information processing terminal 10 can display the session state of each user, using gradation of a color, density of a pattern, or the like. For example, in the case of the example illustrated in the left in FIG. 3, the information processing terminal 10 sets the density of the patterns of the additional information AI1 and AI2 to be high because the session is open for both the user U1 and the user U2. In the case of the example illustrated in the center in FIG. 3, the information processing terminal 10 sets the density of the pattern of the corresponding additional information AI2 to be low because the session for the user U2 is not open. That is, in the case of the example illustrated in the center in FIG. 3, the user U1 is identified and the session is open, whereas the user U2 is identified but the session is not open.

As described above, the information processing terminal 10 according to the present embodiment can intuitively present the identification state and the session state for each user. Furthermore, the information processing terminal 10 according to the present embodiment can output information regarding a detection state in addition to the session state and the identification state. The right in FIG. 3 illustrates an example of a case where the information processing terminal 10 outputs additional information AI3 corresponding to a user U3 who is detected but is not individually identified, in addition to the additional information AI1 corresponding to the user U1 who is individually identified.

In the case of the example illustrated in the right in FIG. 3, the information processing terminal 10 expresses that the user U3 is not individually identified, using the additional information AI3 having a dot pattern. Note that, in a case of expressing the additional information AI3 using a color, the information processing terminal 10 may express that the individual is not identified, using gray or the like, for example. Furthermore, the information processing terminal 10 can present the session state, using gradation of a color or density of a pattern, similarly to the state where the individual is not identified.

Furthermore, the information processing terminal 10 may present a direction in which each user is detected, using a shape of corresponding additional information or the like. In the cases of the examples illustrated in FIG. 3, the information processing terminal 10 expresses the detection direction by causing lower ends of the additional information AI to AI3 represented by ellipses to face the directions in which the corresponding users are detected.

As described above, the information processing terminal 10 according to the present embodiment can express, for each user, the detection state, the detection direction, the identification state, and the session state regarding each of the plurality of users. According to the above-described function of the information processing terminal 10 of the present embodiment, each user can intuitively perceive the detection state, the identification state, or the session state regarding the user himself/herself and can give utterance according to the situation. Note that, in a case where requirements for presenting the above information to the user are satisfied, the information processing terminal 10 may present the information using a non-visual expression such as a sound or tactile feedback.

<<1.2. System Configuration Example>>

Figure 4:
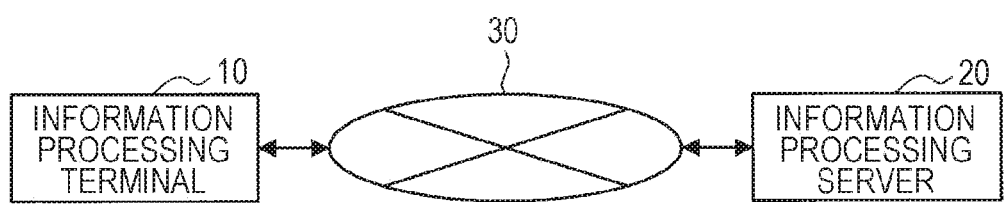
FIG. 4 is a block diagram illustrating a configuration example of an information processing system according to the embodiment.

Next, a configuration example of an information processing system according to an embodiment of the present disclosure will be described. FIG. 4 is a block diagram illustrating a configuration example of an information processing system according to the present embodiment. Referring to FIG. 4, the information processing system according to the present embodiment includes the information processing terminal 10 and the information processing server 20. Furthermore, the information processing terminal 10 and the information processing server 20 are connected so as to communicate with each other via a network 30.

(Information Processing Terminal 10)

The information processing terminal 10 according to the present embodiment is an information processing apparatus that outputs visual information and sound information for user's input or the like on the basis of control by the information processing server 20. The information processing terminal 10 according to the present embodiment is characterized in outputting, for each user, an executability state of recognition processing for a user input particularly in a situation where a plurality of users is present.

The information processing terminal 10 according to the present embodiment may be, for example, a smartphone, a tablet, a general-purpose computer, or a stationary-type or an autonomous mobile-type dedicated device.

(Information Processing Server 20)

The information processing server 20 according to the present embodiment is an information processing apparatus that controls a behavior of the information processing terminal 10 on the basis of a result of the recognition processing for a user input. At this time, the information processing server 20 according to the present embodiment is characterized in dynamically controlling, for each user, an output of an executability state of the recognition processing for a user input in a situation where a plurality of users is present.

(Network 30)

The network 30 has a function to connect the information processing terminal 10 and the information processing server 20. The network 30 may include a public network such as the Internet, a telephone network, and a satellite network, various local area networks (LAN) including Ethernet (registered trademark), a wide area network (WAN), and the like. Furthermore, the network 30 may include a leased line network such as an internet protocol-virtual private network (IP-VPN). Furthermore, the network 30 may include a wireless communication network such as Wi-Fi (registered trademark) and Bluetooth (registered trademark).

A configuration example of the information processing system according to the present embodiment has been described. Note that the above-described configuration described with reference to FIG. 4 is merely an example, and the configuration of the information processing system according to the present embodiment is not limited to the example. For example, the functions of the information processing terminal 10 and the information processing server 20 according to the present embodiment may be implemented by a single device. The configuration of the information processing system according to the present embodiment can be flexibly modified according to specifications and operations.

<<1.3. Functional Configuration Example of Information Processing Terminal 10>>

Figure 5:
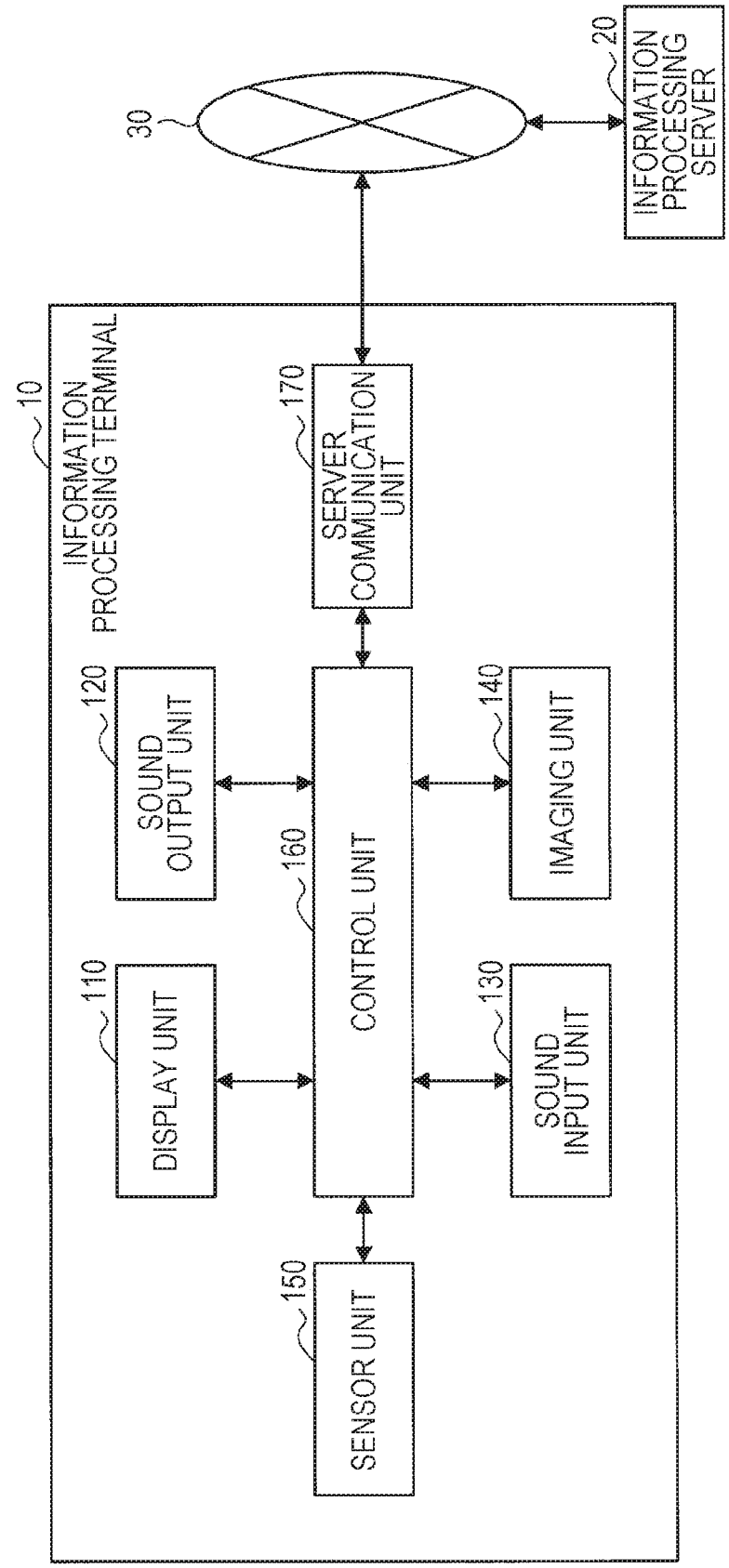
FIG. 5 is a block diagram illustrating a functional configuration example of the information processing terminal according to the embodiment.

Next, a functional configuration example of the information processing terminal 10 according to the present embodiment will be described. FIG. 5 is a block diagram illustrating a functional configuration example of the information processing terminal 10 according to the present embodiment. Referring to FIG. 5, the information processing terminal 10 according to the present embodiment includes a display unit 110, a sound output unit 120, a sound input unit 130, an imaging unit 140, a sensor unit 150, a control unit 160, and a server communication unit 170.

(Display Unit 110)

The display unit 110 according to the present embodiment has a function to output visual information such as images and texts. The display unit 110 according to the present embodiment displays the additional information indicating the executability state of the recognition processing on the basis of the control by the information processing server 20, for example.

For this purpose, the display unit 110 according to the present embodiment includes a display device for presenting the visual information, and the like. Examples of the display device include a liquid crystal display (LCD) device, an organic light emitting diode (OLED) device, a touch panel, and the like. Furthermore, the display unit 110 according to the present embodiment may output the visual information using a projection function.

(Sound Output Unit 120)

The sound output unit 120 according to the present embodiment has a function to output various sounds including sounds. The sound output unit 120 according to the present embodiment outputs an answer to an utterance of the user using sound on the basis of control by the information processing server 20, for example. For this purpose, the sound output unit 120 according to the present embodiment includes a sound output device such as a speaker and an amplifier.

(Sound Input Unit 130)

The sound input unit 130 according to the present embodiment has a function to collect sound information such as an utterance by the user and an ambient sound generated around the information processing terminal 10. The sound information collected by the sound input unit 130 is used for sound recognition by the information processing server 20. The sound input unit 130 according to the present embodiment includes a plurality of microphones for collecting the sound information.

(Imaging Unit 140)

The imaging unit 140 according to the present embodiment has a function to capture an image of the user and the surrounding environment. Image information captured by the imaging unit 140 is used for detection and identification of the user by the information processing server 20. The imaging unit 140 according to the present embodiment includes an imaging device that can capture an image. Note that the above image includes a moving image in addition to a still image.

(Sensor Unit 150)

The sensor unit 150 according to the present embodiment has a function to collect various types of sensor information regarding the surrounding environment and the user. The sensor information collected by the sensor unit 150 is used for user detection by the information processing server 20, for example. The sensor unit 150 includes, for example, a human sensor including an infrared sensor, and the like.

(Control Unit 160)

The control unit 160 according to the present embodiment has a function to control configurations included in the information processing terminal 10. The control unit 160 controls, for example, start and stop of the configurations. Furthermore, the control unit 160 inputs a control signal generated by the information processing server 20 to the display unit 110 and the sound output unit 120. Furthermore, the control unit 160 according to the present embodiment may have a function equivalent to an output control unit 250 of the information processing server 20 to be described below.

(Server Communication Unit 170)

The server communication unit 170 according to the present embodiment has a function to perform information communication with the information processing server 20 via the network 30. Specifically, the server communication unit 170 transmits the sound information collected by the sound input unit 130, the image information captured by the imaging unit 140, and the sensor information collected by the sensor unit 150 to the information processing server 20. Furthermore, the server communication unit 170 receives a control signal and the like regarding output of symbols and additional information from the information processing server 20.

A functional configuration example of the information processing terminal 10 according to the present embodiment has been described. Note that the above-described configuration described with reference to FIG. 5 is merely an example, and the functional configuration of the information processing terminal 10 according to the present embodiment is not limited to the example. For example, the information processing terminal 10 according to the present embodiment does not necessarily have all of the configurations illustrated in FIG. 5. For example, the information processing terminal 10 can have a configuration without including the imaging unit 140, the sensor unit 150, and the like. Furthermore, as described above, the control unit 160 according to the present embodiment may have a function equivalent to the output control unit 250 of the information processing server 20. The functional configuration of the information processing terminal 10 according to the present embodiment can be flexibly modified according to specifications and operations.

<<1.4. Functional Configuration Example of Information Processing Server 20>>

Figure 6:
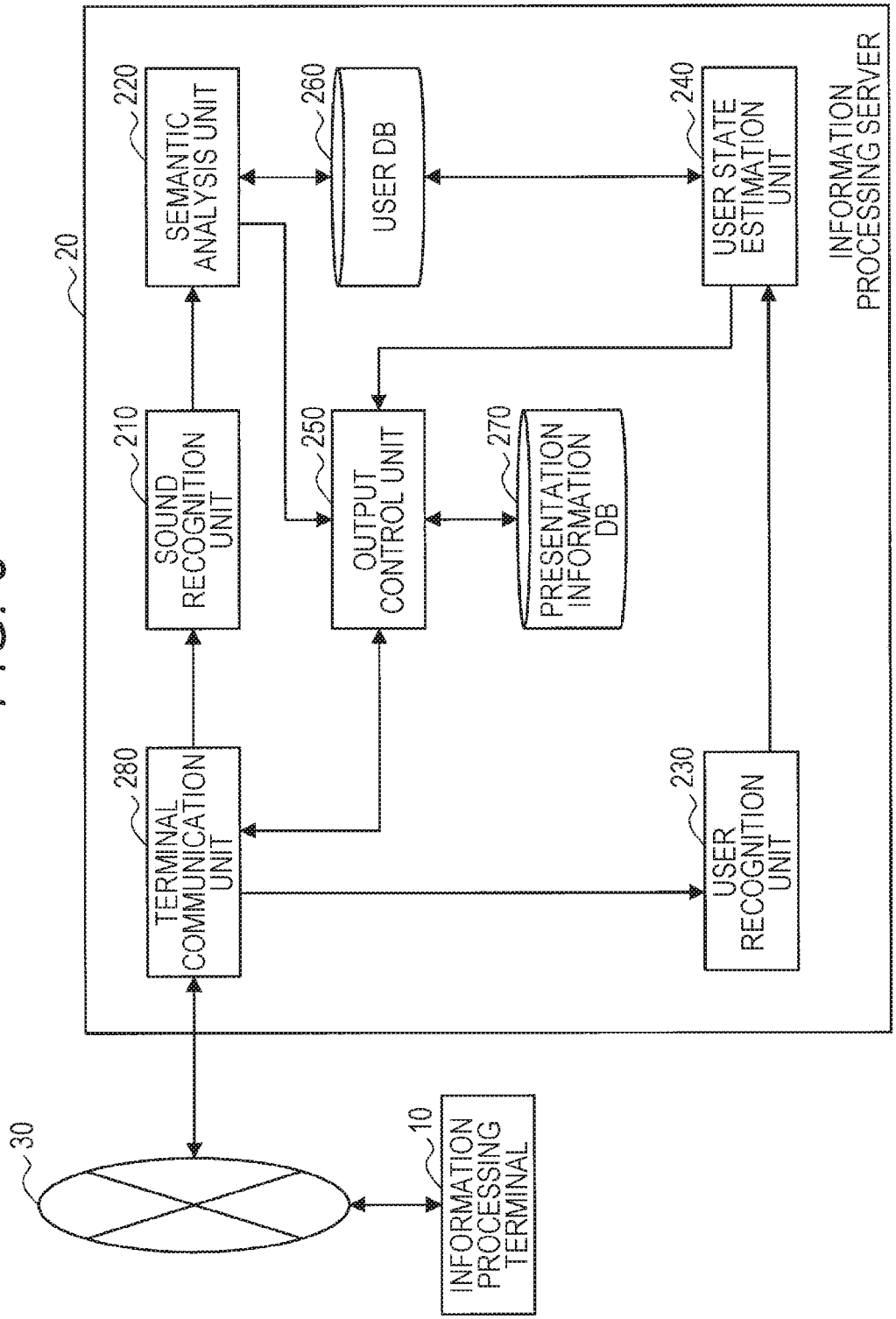
FIG. 6 is a block diagram illustrating a functional configuration example of an information processing server according to the embodiment.

Next, a functional configuration example of the information processing server 20 according to the embodiment of the present disclosure will be described. FIG. 6 is a block diagram illustrating a functional configuration example of the information processing server 20 according to the present embodiment. Referring to FIG. 6, the information processing server 20 according to the present embodiment includes a sound recognition unit 210, a semantic analysis unit 220, a user recognition unit 230, a user state estimation unit 240, the output control unit 250, a user DB 260, a presentation information DB 270, and a terminal communication unit 280.

(Sound Recognition Unit 210)

The sound recognition unit 210 according to the present embodiment executes sound recognition processing on the basis of the sound information regarding an utterance of the user collected by the information processing terminal 10.

(Semantic Analysis Unit 220)

The semantic analysis unit 220 according to the present embodiment performs a semantic analysis regarding the utterance of the user recognized by the sound recognition unit 210. At this time, the semantic analysis unit 220 may perform a semantic analysis optimized for each individual user on the basis of a user's utterance tendency stored in the user DB 260 or the like. The output control unit 250 according to the present embodiment can cause the information processing terminal 10 to output an answer corresponding to the utterance or the like on the basis of a meaning of the utterance analyzed by the semantic analysis unit 220.

(User Recognition Unit 230)

The user recognition unit 230 according to the present embodiment detects and identifies the user on the basis of the sound information, image information, sensor information, and the like collected by the information processing terminal 10. At this time, the user recognition unit 230 can identify the user by comparing sound data and face image data of the user stored in the user DB 260.

(User State Estimation Unit 240)

The user state estimation unit 240 according to the present embodiment estimates various states regarding the user on the basis of the sound information, image information, and sensor information collected by the information processing terminal 10. The user state estimation unit 240 according to the present embodiment may estimate the detection direction of the user on the basis of the sound information collected by the plurality of microphones provided in the information processing terminal 10, a face detection result, and the like, for example.

(Output Control Unit 250)

The output control unit 250 according to the present embodiment has a function to control the behavior of the information processing terminal 10 on the basis of the recognition processing result for a user input. The output control unit 250 according to the present embodiment is characterized in dynamically controlling, for each user, an output of an executability state of the recognition processing for a user input in a situation where a plurality of users is present.

More specifically, the output control unit 250 according to the present embodiment may control display regarding the session state regarding the recognition processing, the presence or absence of detection, the detection direction, the identification state, of the user, and the like.

Furthermore, the output control unit 250 according to the present embodiment has a function to output various types of information to the information processing terminal 10 on the basis of a meaning of an utterance analyzed by the semantic analysis unit 220. At this time, the output control unit 250 searches for information stored in the presentation information DB 270 on the basis of the meaning of the utterance analyzed by the semantic analysis unit 220 to acquire the information corresponding to the meaning of the utterance, for example, thereby outputting sound and visual information corresponding to the information to the information processing terminal 10.

(User DB 260)

The user DB 260 according to the present embodiment widely stores various types of information regarding the user. The user DB 260 stores, for example, information such as a face image, a sound characteristic, a preference, and a tendency, in addition to basic information such as user's name, age, and gender.

(Presentation Information DB 270)

The presentation information DB 270 according to the present embodiment stores various types of information intended to be presented to the user. The presentation information DB 270 may store, for example, spot information including restaurants and the like, general knowledge, and the like.

(Terminal Communication Unit 280)

The terminal communication unit 280 according to the present embodiment performs information communication with the information processing terminal 10 via the network 30. For example, the terminal communication unit 280 receives the sound information, image information, sensor information, and the like from the information processing terminal 10. Furthermore, the terminal communication unit 280 transmits a control signal regarding output control generated by the output control unit 250 to the information processing terminal 10.

Heretofore, the functional configuration example of the information processing server 20 according to the embodiment of the present disclosure has been described. Note that the above-described configuration described with reference to FIG. 6 is merely an example, and the functional configuration of the information processing server 20 according to the present embodiment is not limited to the example. For example, the above-described configuration may be implemented by a plurality of devices in a distributed manner. Furthermore, the functions of the information processing terminal 10 and the information processing server 20 may be implemented by a single device, as described above. The functional configuration of the information processing server 20 according to the present embodiment can be flexibly modified according to specifications and operations.

<<1.5. Specific Example of Output Control>>

Next, output control by the output control unit 250 according to the present embodiment will be described using a specific example. As described above, the output control unit 250 according to the present embodiment can dynamically control output of the executability state of the sound recognition processing for each user.

Furthermore, the output control unit 250 according to the present embodiment may control display of the symbol on the display area corresponding to the agent function to interact with the user based on the sound recognition processing. At this time, the output control unit 250 according to the present embodiment is characterized in performing display control so that the users can visually recognize the presence or absence of detection, the detection directions, the identification states, and the session states regarding a plurality of users, and the above-described symbols, at the same time.

As described above, the symbol according to the present embodiment is a visual expression for substantiating the agent function in the display area, and the user can pose various utterances to the symbol and enjoy the provision function to the utterances. Therefore, by displaying the symbol, the session state, and the like at positions where the user can visually recognize them at the same time, the user can give utterance while recognizing the state without moving the line-of-sight, and the convenience for the user can be improved.

Note that the agent function can be represented by, for example, a living thing such as a person or an anthropomorphic animal. However, the output control unit 250 according to the present embodiment may display the symbol as abstract visual information that does not imitate a living thing. In the case of expressing the agent function using a human figure or the like, it is assumed that the impression of the agent is strongly influenced by the user's preference or the like, and the scenes used are limited. For this reason, the output control unit 250 according to the present embodiment can provide the agent function having a less preference for a user or a scene by expressing the symbol using abstract visual information.

Figure 7:
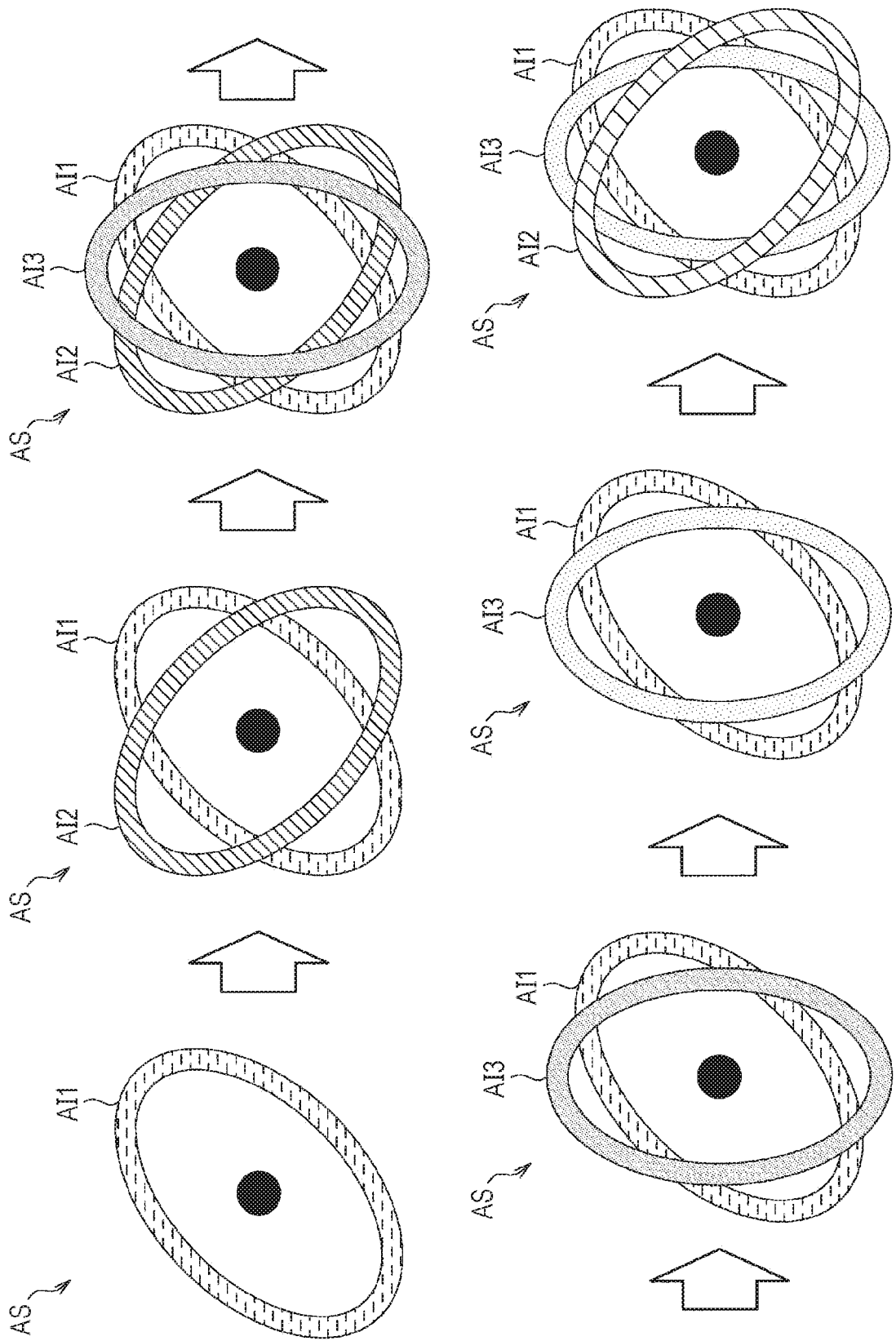
FIG. 7 is a diagram illustrating a transition example of additional information controlled by an output control unit according to the embodiment.

Here, transition of the additional information controlled by the output control unit 250 according to the present embodiment will be described using a specific example. FIG. 7 is a diagram illustrating a transition example of the additional information controlled by the output control unit 250 according to the present embodiment.

First, the upper left in FIG. 7 illustrates an example of the additional information displayed in a case where the user U1 gives utterance using the activation word. At this time, the output control unit 250 causes the information processing terminal 10 to display the additional information AI1 using the pattern corresponding to the identified user U1. Furthermore, the output control unit 250 can indicate that the session for the user U1 is open by setting the density of the pattern of the additional information AI1 to be high.

Moreover, as described above, the output control unit 250 can express the detection direction in which the user U1 is detected by the shape of the additional information AI1. Specifically, the output control unit 250 may dynamically control the output of the additional information AI1 such that the lower end of the additional information AI1 represented by an ellipse faces the detection direction. Note that the above detection direction may be a detection direction with reference to the display position of the symbol AS on the display area.

Next, the upper center in FIG. 7 illustrates an example of the additional information displayed in a case where the user U2 appears from the right of the display area and utters using the activation word. At this time, the output control unit 250 causes the information processing terminal 10 to display the additional information AI2 using the pattern corresponding to the identified user U2. Furthermore, the output control unit 250 indicates that the session for the user U2 is open by setting the density of the pattern of the additional information AI2 to be high. Furthermore, the output control unit 250 may indicate the detection direction of the user U2 by the shape of the additional information AI2.

Furthermore, the output control unit 250 may continuously indicate that the session state and the identification state of the user U1 are maintained using the additional information AI1. Note that in a case where there is a change in the detection direction of the user U1, the output control unit 250 can dynamically change the shape of the additional information AI1 according to the detection direction. In the following flow, description regarding the detection direction of the user is omitted.

Next, the upper right in FIG. 7 illustrates an example of the additional information displayed in a case where the user U3 appears near the center of the display area and utters using the activation word. At this time, the output control unit 250 displays the additional information AI3 using a dot pattern indicating an unknown user because the user U3 cannot be individually identified. Furthermore, the output control unit 250 indicates that the session for the user U3 (unknown user) is open by setting the density of the dot pattern of the additional information AI3 to be high.

Next, the lower left in FIG. 7 illustrates an example of the additional information displayed in a case where the user U2 disappears from the vicinity of the information processing terminal 10 and the identification states and the session states of the users U1 and U3 are maintained. At this time, the output control unit 250 causes the information processing terminal 10 to stop displaying the additional information AI2 corresponding to the user U2 who is no longer detected.

Next, the lower center in FIG. 7 illustrates an example of the additional information displayed in a case where the session is disconnected due to, for example, a situation where the user U3 as an unknown user has not uttered longer than a predetermined time. At this time, the output control unit 250 reduces the density of the dot pattern regarding the additional information AI3 on the basis of the disconnection of the session for the user U3. Meanwhile, since the user U1 continues to utter, the output control unit 250 may express that the session state is maintained by maintaining the density of the pattern of the additional information AI1.

Next, the lower right in FIG. 7 illustrates an example of the additional information displayed in a case where the user U2 appears again from the right of the display area and does not give utterance using the activation word. At this time, the output control unit 250 redisplays the additional information AI2 using the pattern corresponding to the user U2, and expresses that the session for the user U2 is not open by setting the density of the pattern to be low. Furthermore, the output control unit 250 may maintain the output expressions of the additional information AI1 and AI3 on the basis of the fact that no change occurs in the identification states and the session states of the user U1 and the user U3.

The output control of the additional information by the output control unit 250 according to the present embodiment has been described using a specific example. As described above, the output control unit 250 according to the present embodiment can dynamically display, for each user, the session state regarding the sound recognition processing, the presence or absence of detection, the detection direction, and the identification state, of the user. According to the above function of the output control unit 250 of the present embodiment, each user grasps his/her own detection information and identification state and also visually recognizes whether or not the session is open, thereby determining the necessity of the activation word and using the system without stress.

Furthermore, the additional information according to the present embodiment may include an execution state of the sound recognition state and an execution state of the response generation processing (including search processing, for example) based on the result of the sound recognition processing, in addition to the above-described presence or absence of detection, detection direction, identification state, and session state. The output control unit 250 according to the present embodiment can perform display control such that the user can visually recognize the additional information AI indicating the execution state as described above and the symbol AS at the same time.

For example, the output control unit 250 can express the above-described execution state and the session state and the like at the same time using flicker of color, shape change such as expansion and contraction, or behavior such as rotation. According to the above-described function of the output control unit 250 of the present embodiment, the user can grasp various states without moving the line-of-sight while gazing at the symbol AS, whereby the convenience can be further improved.

Next, control regarding the display position of the symbol and the additional information by the output control unit 250 according to the present embodiment will be described. The output control unit 250 according to the present embodiment can control the display positions of the above-described symbol and additional information according to various situations.

For example, in a case where a single agent function is used by a plurality of users at home, workplace, or the like, the output control unit 250 may display the symbol and additional information at positions that can be easily accepted as a member of family or workplace.

Specifically, the output control unit 250 may display the symbol and the additional information at an intermediate position of users who give utterance on the basis of the detection directions of the plurality of identified users and a detected utterance turn of the plurality of users to give response to a request or the like. Furthermore, in a case where the utterance turn is switched from one user to another user, the output control unit 250 can perform display control to move the symbol in the detection direction of the user who give utterance in turn, for example.

The above-described function of the output control unit 250 according to the present embodiment can cause the symbol to perform the behavior focusing on the relative position between speakers or a person who is speaking, as is performed by an actual person, thereby implementing a more familiar interface.

Furthermore, the output control unit 250 may control the display positions of the symbols and the additional information on the basis of an attribute, a state, or the like of the user. For example, in a case where the user is a child or a case where the user is sitting, the output control unit 250 may display the symbol at a low position in the display area. Meanwhile, in a case where the user is an adult or a case where the user is standing, the output control unit 250 may display the symbol at a high position in the display area.

Furthermore, in a case of performing independent information presentation not depending on the input from the user, the output control unit 250 may perform display control such that the symbol becomes prominent. At this time, the output control unit 250 may display, for example, the symbol at a higher position in the display area. Furthermore, the output control unit 250 may display the symbol larger than in a normal state. Furthermore, the output control unit 250 may perform control such that the symbol is brought closer to the user who is notified of information, for example.

As described above, the output control unit 250 according to the present embodiment can dynamically control the display position of the symbol according to various situations such as the detected position of the user.

Furthermore, the output control unit 250 according to the present embodiment may control display of a plurality of symbols corresponding to a plurality of agent functions. For example, in a case where each user has a dedicated agent function at home, the output control unit 250 can dynamically control the display of symbols corresponding to the plurality of agent functions of the users.

Figure 8A:
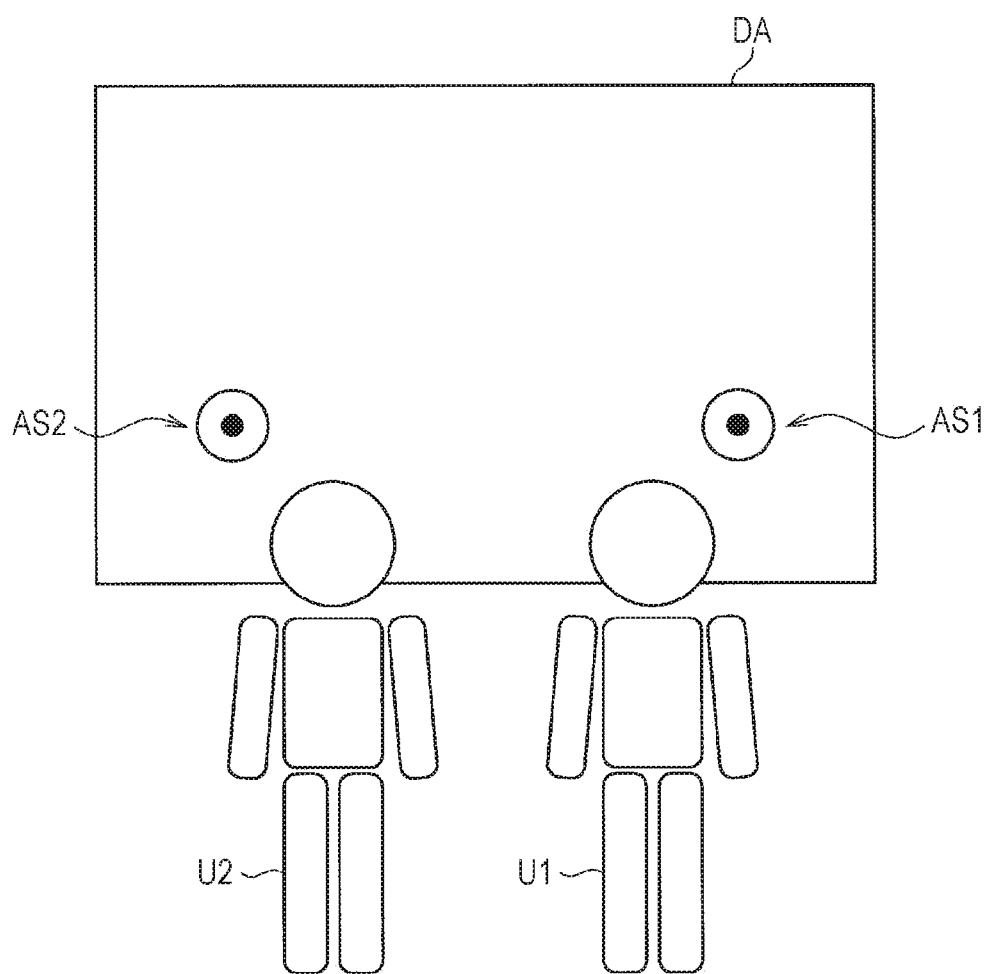
FIG. 8A is a diagram for describing display control of a plurality of symbols by the output control unit 250 according to the embodiment.
Figure 8B:
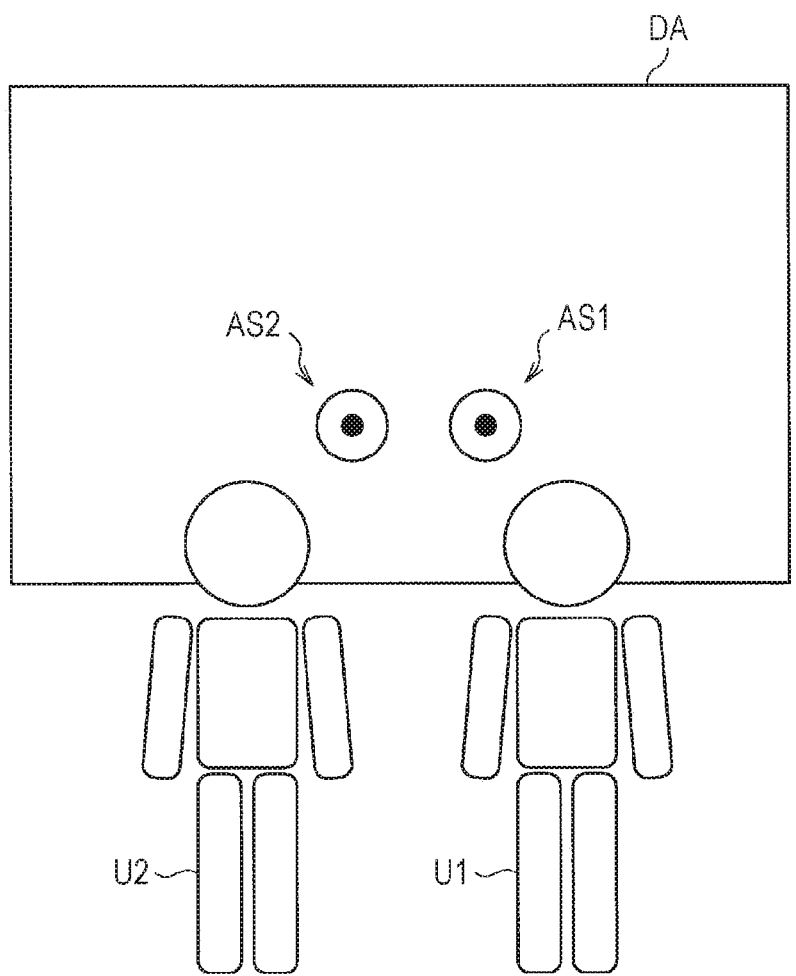
FIG. 8B is a diagram for describing display control of a plurality of symbols by the output control unit 250 according to the embodiment.

FIGS. 8A and 8B are diagrams for describing display control of a plurality of symbols by the output control unit 250 according to the present embodiment. FIG. 8A illustrates a display example of symbols in a case where each user has a dedicated agent function and each agent does not accept an utterance of a user other than the dedicated user.

In the example illustrated in FIG. 8A, the output control unit 250 simultaneously controls display of a symbol AS1 corresponding to the dedicated agent function of the user U1 and a symbol AS2 corresponding to the dedicated agent function of the user U2.

At this time, the output control unit 250 may dynamically and independently control the display positions of the symbols AS1 and AS2 on the basis of detected positions (detection directions) of the users U1 and U2. Specifically, in a case where a conversation is being held between user U1 and user U2 and there is no call to the agent functions, the output control unit 250 may display the symbols AS1 and AS2 beside the users U1 and U2, respectively, to avoid the symbols AS1 and AS2 to be located between the users U1 and U2. Furthermore, at this time, the output control unit 250 can control the display of the symbols AS1 and AS2 so as to follow detected position change of the users U1 and U2.

Furthermore, FIG. 8B illustrates a display example of symbols in a case where each user has a dedicated agent function but each agent copes with an utterance of a user other than the user who is the owner. In this case, the output control unit 250 may display the symbols AS1 and AS2 between the users U1 and U2, unlike the example illustrated in the example in FIG. 8A, but the output control unit 250 may perform control of displaying the symbols AS1 and AS2 at positions higher than the heads of the users U1 and U2, for example, so as not to disturb the conversation between the users U1 and U2. Furthermore, the output control unit 250 may perform, for example, display control of bringing the symbols AS1 and AS2 closer to the user who has uttered or returning the symbols AS1 and AS2 to the original positions after bringing closer (an action to turn the lines-of-sight).

Furthermore, an object to be controlled and displayed by the output control unit 250 is not limited to the symbol corresponding to an internal agent function provided by the information processing server 20. The output control unit 250 according to the present embodiment may control display of an external symbol corresponding to an agent function provided by a third party.

Figure 9B:
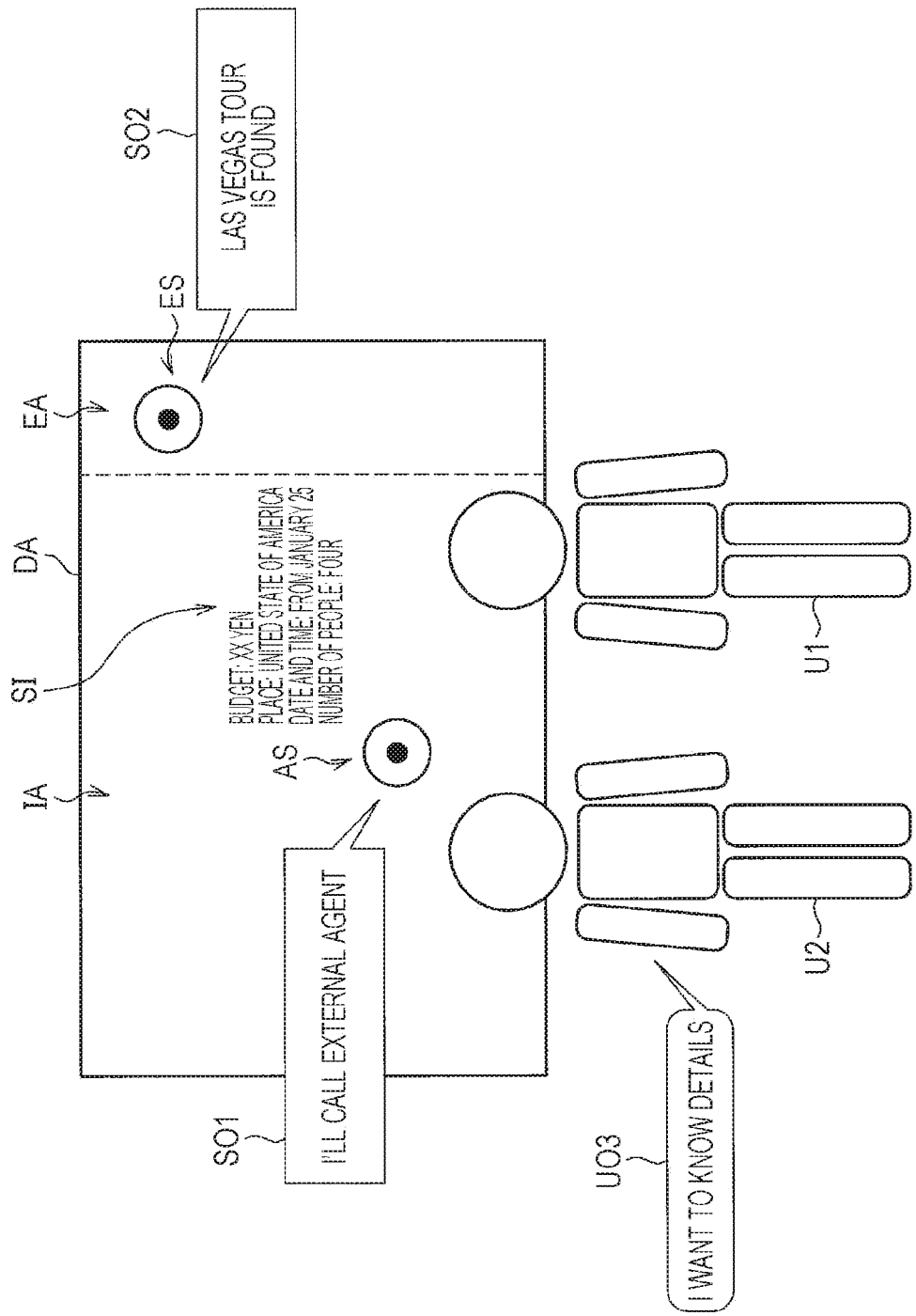
FIG. 9B is a diagram for describing display control of an external symbol by the output control unit according to the embodiment.
Figures 9C, 10:
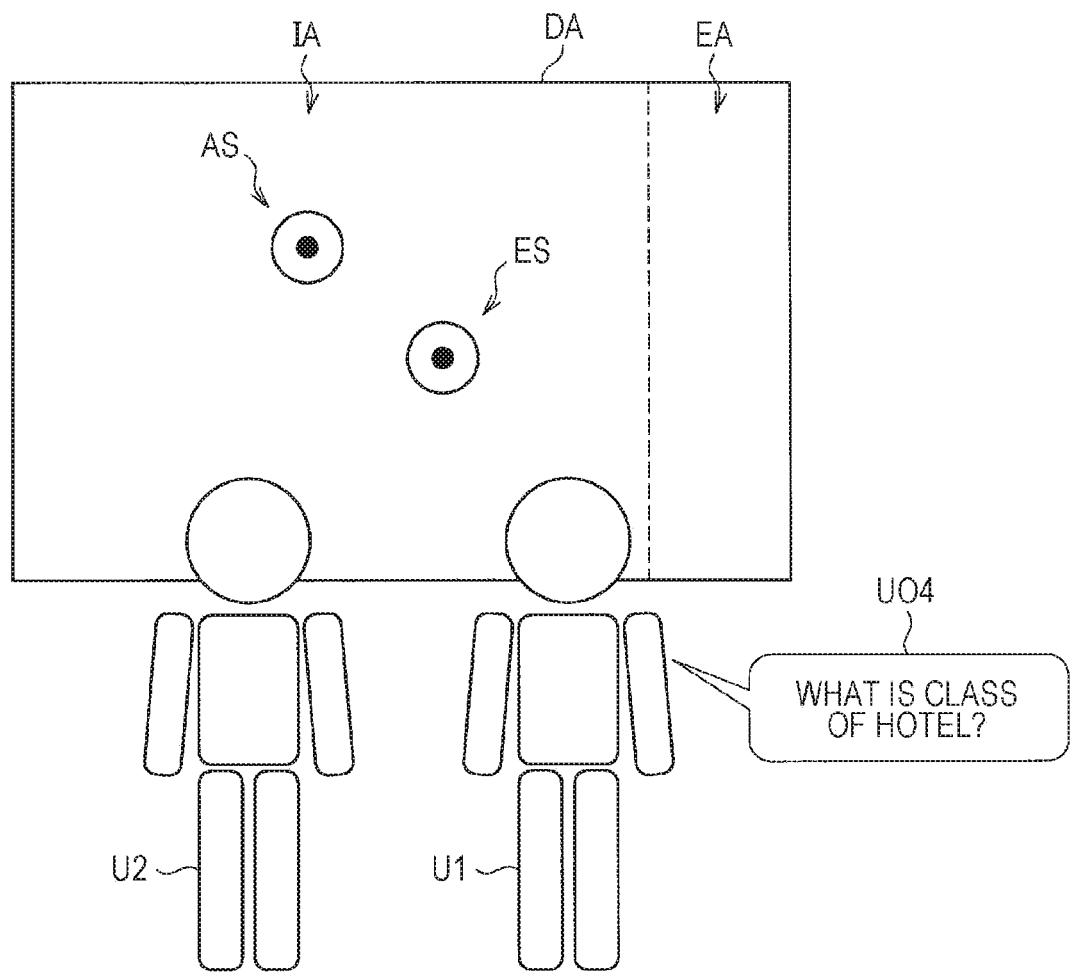
FIG. 9C is a diagram for describing display control of an external symbol by the output control unit according to the embodiment.
FIG. 10 is a table summarizing a relationship between the additional information and modals according to the embodiment.

FIGS. 9A, 9B, and 9C are diagrams for describing display control of an external symbol by the output control unit 250 according to the present embodiment. In FIGS. 9A, 9B, and 9C, the output control unit 250 simultaneously performs display control regarding the symbol AS corresponding to the internal agent function and an external symbol ES corresponding to an external agent function provided by a third party. Note that the external symbol ES may be a symbol corresponding to the external agent function provided by a travel agency.

Here, the output control unit 250 according to the present embodiment may set, as illustrated in FIG. 9A, an internal area IA for displaying the symbol AS corresponding to the internal agent function and an external area EA for displaying the external symbol in the display area DA. Furthermore, at this time, the output control unit 250 performs control such that information regarding an utterance of the user is not transmitted to the external agent function corresponding to the external symbol ES arranged in the external area EA.

For example, in the case of the example illustrated in FIG. 9A, the users U1 and U2 are giving utterances UO1 and UO2 including information regarding bonuses, information regarding ordinary travel expenses, family personal information, and the like. At this time, the output control unit 250 causes the above-described sensitive information not to be transmitted to the external area EA, thereby preventing the information from accidentally leaking out.

Meanwhile, when using the external agent function, the output control unit 250 according to the present embodiment may generalize the content of the utterances of the users and pass the generalized content to the external agent function relating to the external symbol. In the case of the example illustrated in FIG. 9B, the output control unit 250 generates delivery information SI that is the generalized content of the utterances UO1 and UO2 illustrated in FIG. 9A, displays the delivery information SI on the display area DA, and outputs a sound utterance SO1 indicating an inquiry of the external agent function. By displaying the generated delivery information SI on the display area DA in this way, the user can clearly grasp what information is transmitted to the outside.

Note that the output control unit 250 may generate the delivery information SI as illustrated in FIG. 9B according to a format of API provided by the external agent function. In the case of the example illustrated in FIG. 9B, the output control unit 250 generates the delivery information SI including items such as budget, place, date and time, and number of people defined for searching for a tour. Furthermore, at this time, the output control unit 250 automatically sets the budget from the bonus information and the like included in the utterance U01 illustrated in FIG. 9A and automatically sets the date and time and the number of people from birthday information included in the utterance UO2 and family structure information stored in the user DB 260.

Furthermore, in a case of receiving an answer based on the transmitted delivery information SI from the external agent function, the output control unit 250 may output a sound utterance SO2 and visual information in association with the external symbol ES, as illustrated in FIG. 9B.

Furthermore, at this time, in a case of detecting a request regarding acquisition of details or a direct interaction with the external agent function such as an utterance UO3, the output control unit 250 may perform control of moving the external symbol ES to the internal area IA to cause the user to directly interact with the external agent function relating to the external symbol ES.

FIG. 9C illustrates the external symbol ES moved to the internal area IA on the basis of the utterance SO3 illustrated in FIG. 9B. In this case, the output control unit 250 transmits content of the utterance UO4 or the like as it is to the external agent function relating to the external symbol ES displayed in the internal area, thereby allowing the external agent function to directly interact with the users U1 and U2.

As described above, the output control unit 250 according to the present embodiment clearly separates the display area for the symbol corresponding to the internal agent function and the display area for the external symbol corresponding to the external agent function and controls the information transmission level, thereby preventing the sensitive information from leaking out. Furthermore, the above function of the output control unit 250 according to the present embodiment allows the direct interaction between the external agent function and the user on the basis of the user's request, thereby achieving both the security and the convenience. Note that the external agent function according to the present embodiment may be a function implemented by manned support of an operator or the like, in addition to function provision by artificial intelligence.

The functions of the output control unit 250 according to the present embodiment have been described in detail. As described above, the output control unit 250 according to the present embodiment can dynamically control the display regarding the symbol corresponding to the agent function and various types of additional information. The additional information widely includes information regarding the executability state of the recognition processing, and the detection state and the identification state of the user.

Note that, in the above description, the case where the output control unit 250 displays the session state regarding the sound recognition processing as one of the pieces of additional information has been described as an example. However, the recognition processing and the executability state according to the present embodiment are not limited to the example. The recognition processing according to the present embodiment may widely include, for example, technologies for gesture recognition, emotion estimation, and the like. Even in a case where a plurality of users uses a device using the above-described technologies, the number of users to which the functions can be provided at the same time is finite. Therefore, presenting the executability state of the recognition processing to each user is similarly important.

For this reason, the output control unit 250 according to the present embodiment can express executability states regarding various types of recognition processing, and the detection state and the identification state of the user, using a plurality of modals. FIG. 10 is a table summarizing a relationship between the additional information and modals according to the present embodiment. Referring to FIG. 10, the output control unit 250 may express the detection state of the user using, for example, a modal 1 such as the direction of a display body. Furthermore, the output control unit 250 can express the user's identification state using a modal 2 such as the color of the display body. Furthermore, the output control unit 250 may express the executability of the recognition processing using a modal 3 such as the brightness of the display body.

As described above, the output control unit 250 according to the present embodiment can express the executability states of various types of recognition processing in a various manner using the plurality of modals. For this reason, the method of expressing the additional information described above is merely an example, and the output control unit 250 according to the present embodiment may cause the information processing terminal 10 to display the additional information using another output expression. Hereinafter, various display controls of the additional information by the output control unit 250 will be described using examples.

Figure 11A:
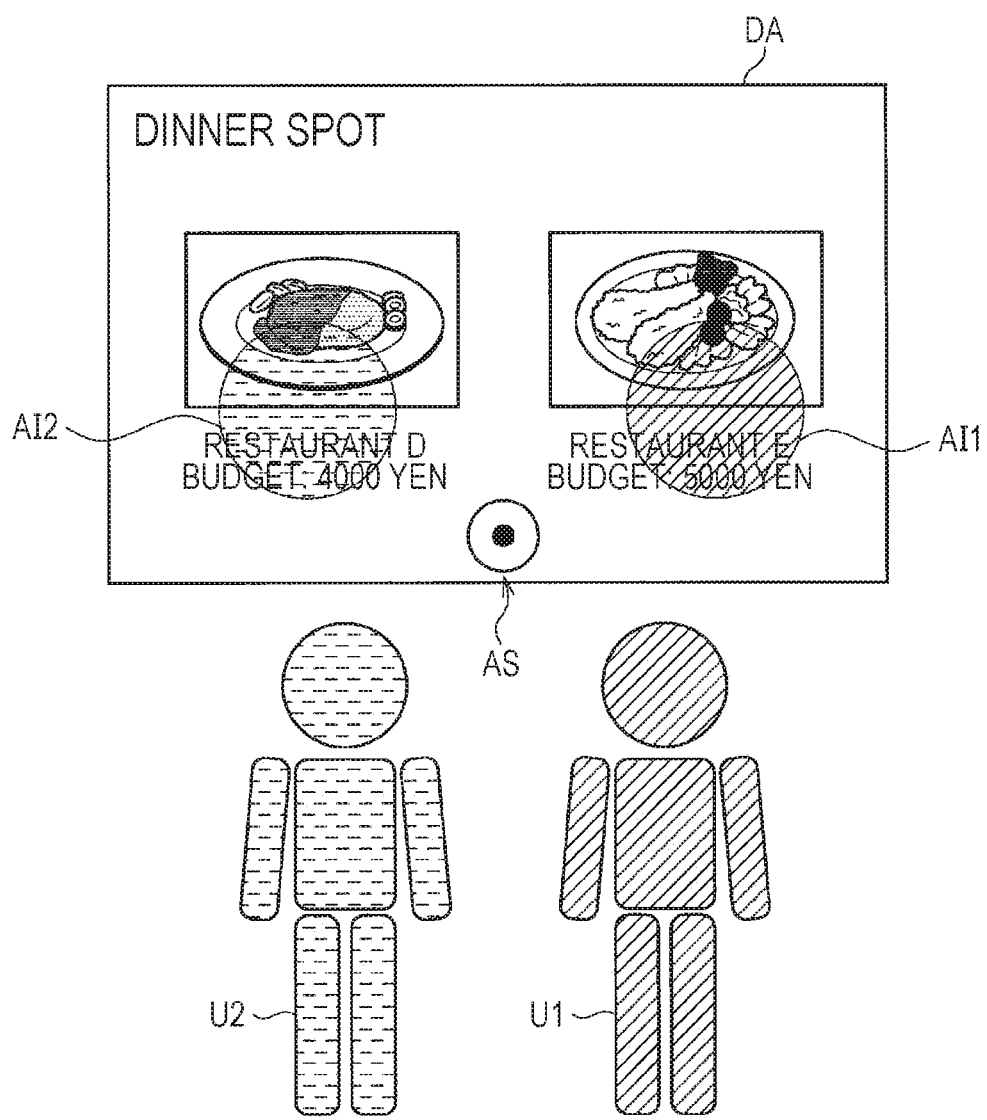
FIG. 11A is a diagram for describing a variation of output expression by the output control unit according to the embodiment.
Figure 11B:
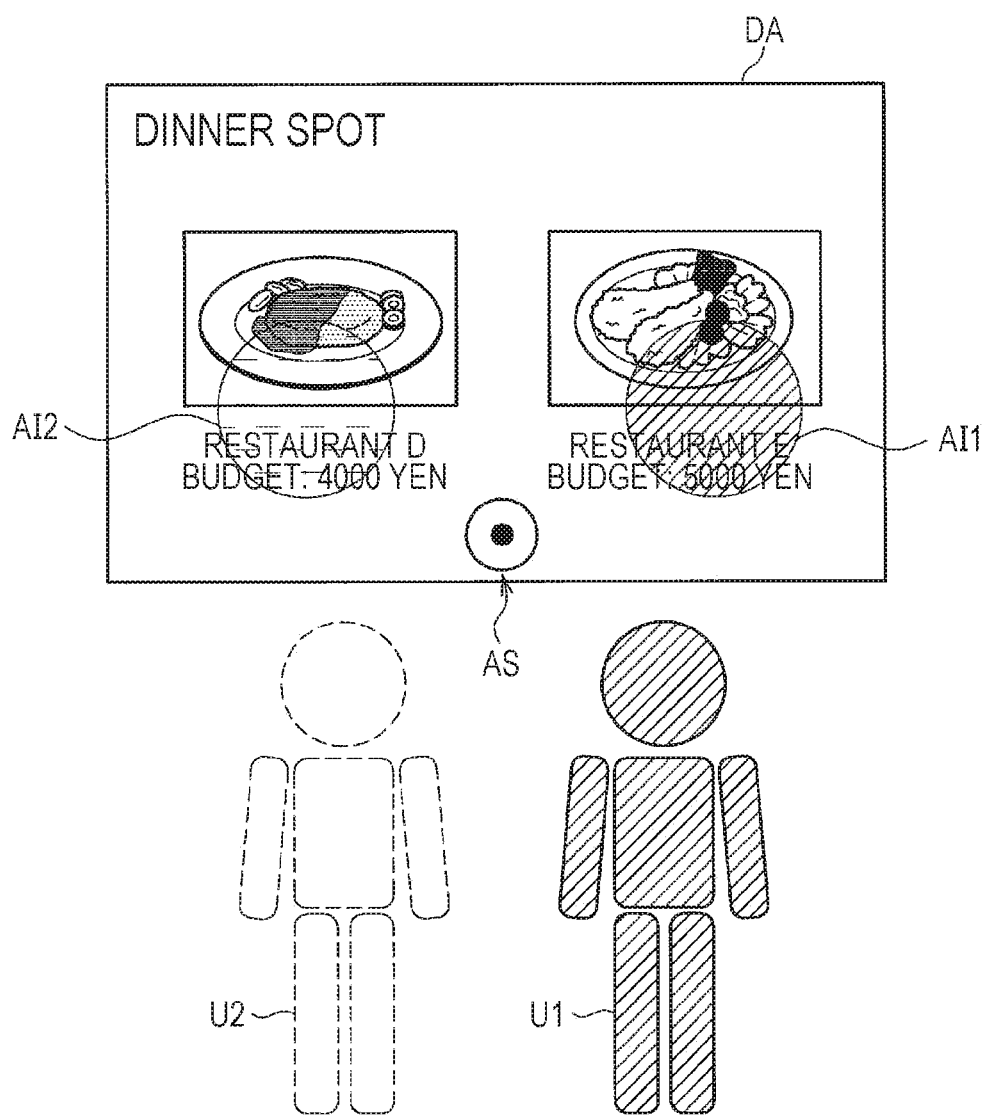
FIG. 11B is a diagram for describing a variation of output expression by the output control unit according to the embodiment.

FIGS. 11A, 11B, 12A, 12B, 13, 14, and 15 are diagrams for describing variations of output expression by the output control unit 250 according to the present embodiment. FIGS. 11A and 11B illustrate examples of a case where the output control unit 250 expresses, for each user, the additional information regarding the detection states and the identification states of the users separately from the symbol AS.

In the case of the example illustrated in FIG. 11A, the output control unit 250 separately outputs the additional information AI1 and AI2 indicating the identification states of the users U1 and U2, using the patterns corresponding to the users U1 and U2. At this time, the output control unit 250 sets the density of the patterns of the additional information AI and AI2 to be high to indicate that the users U1 and U2 are identified.

Meanwhile, in the case of the example illustrated in FIG. 11B, the user U2 is no longer identified and thus the output control unit 250 sets the density of the pattern of the additional information AI2 corresponding to the user U2 to be low. As described above, the output control unit 250 according to the present embodiment can also display the additional information AI regarding the identification state of the user separately from the symbol AS.

Figure 12A:
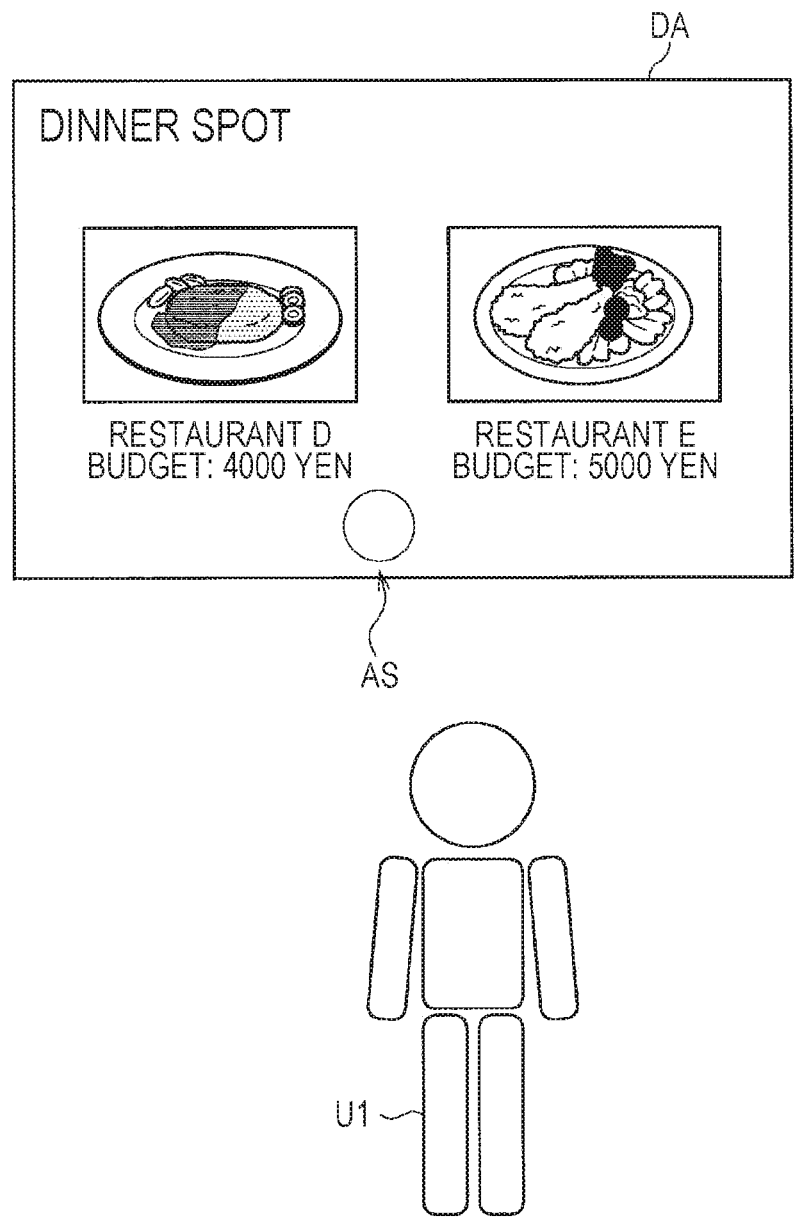
FIG. 12A is a diagram for describing a variation of output expression by the output control unit according to the embodiment.

Furthermore, FIGS. 12A and 12B illustrate examples of a case where the output control unit 250 expresses the additional information by changing the display of the symbol AS itself. For example, in the case of the examples illustrated in FIGS. 12A and 12B, the output control unit 250 expresses whether or not the session is open by changing the size of the symbol AS.

Specifically, in FIG. 12A, the output control unit 250 indicates that the session is open by displaying and emphasizing the symbol AS larger than that in a normal state. Meanwhile, in FIG. 12B, the output control unit 250 displays the symbol AS smaller than the state in FIG. 12A, indicating that the session is not open, that is, the activation word is necessary. As described above, the output control unit 250 according to the present embodiment can also express the additional information such as the session state using only the symbol AS without using a separate display body. Note that, in FIGS. 12A and 12B, the case where the output control unit 250 expresses the session state by changing the size of the symbol AS has been described as an example. However, the output control unit 250 may express the session state using a change in color, brightness, shape, or the like, for example.

Figure 13:
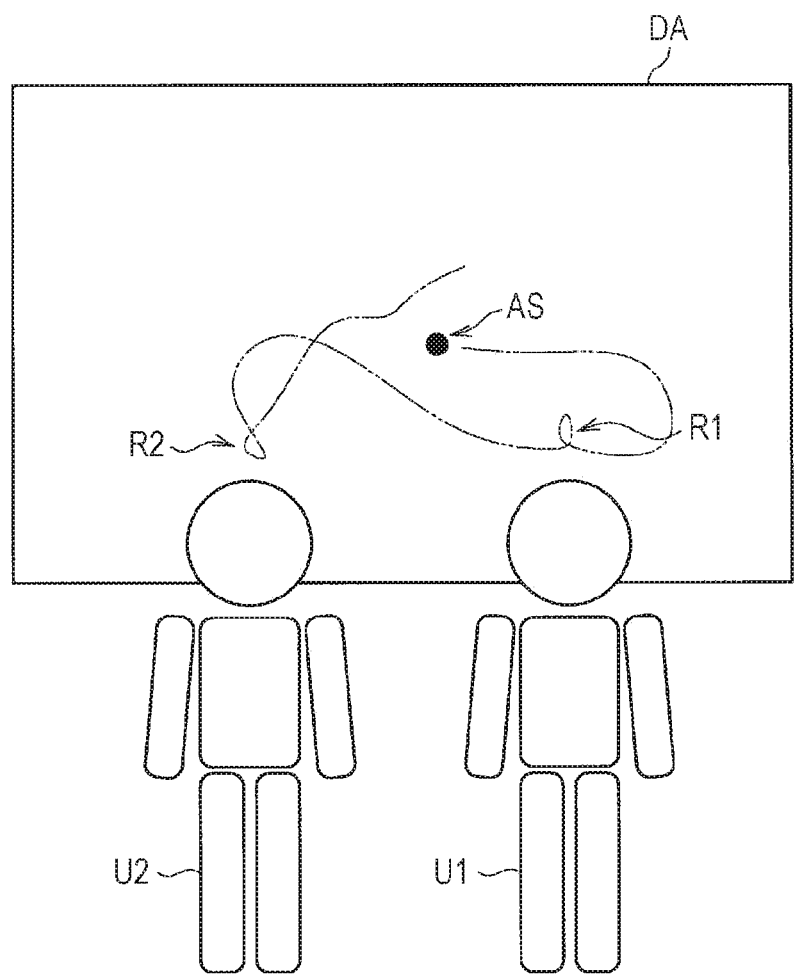
FIG. 13 is a diagram for describing a variation of output expression by the output control unit according to the embodiment.

Furthermore, FIG. 13 illustrates an example of a case where the output control unit 250 expresses the additional information using a behavior of the symbol AS. In the case of the example illustrated in FIG. 13, the output control unit 250 performs display control such that the symbol AS floats around the user for which the session is open. Furthermore, at this time, the output control unit 250 expresses that the session is open for the users U1 and U2, using the behavior of the floating symbol AS.

Specifically, the output control unit 250 expresses that the session is open by controlling the display such that the floating symbol AS performs a rotating motion R1 or R2 to draw a circle when the floating symbol AS approaches the user U1 or the user U2. As described above, the output control unit 250 according to the present embodiment can use the behavior of the symbol AS as one of modals.

Figure 14:
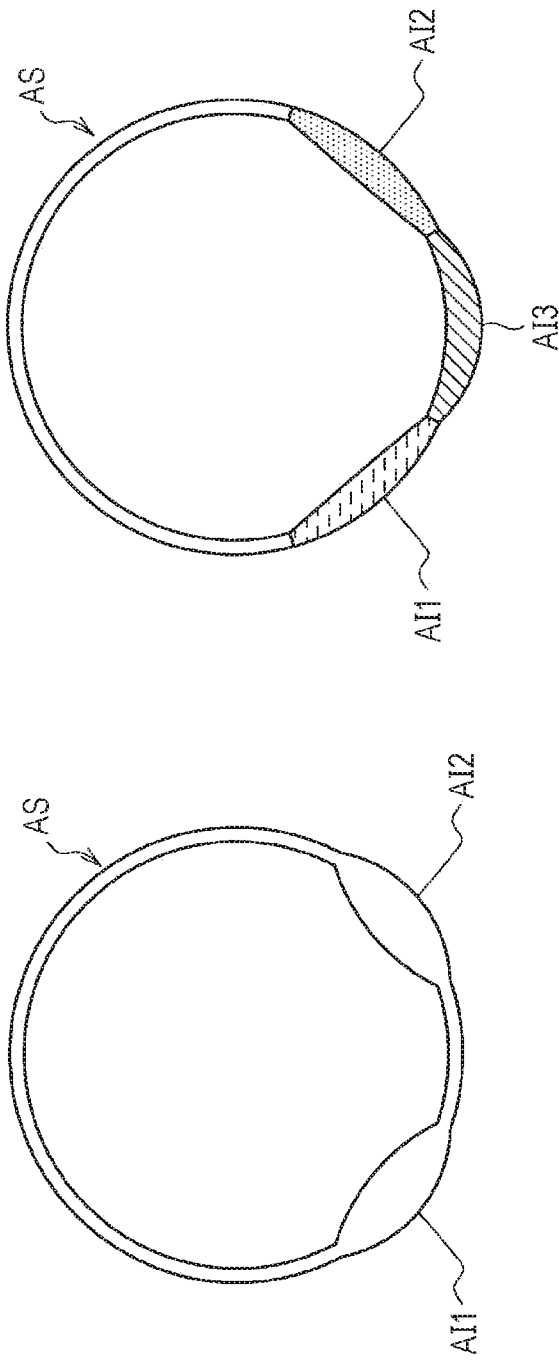
FIG. 14 is a diagram for describing a variation of output expression by the output control unit according to the embodiment.

Furthermore, FIG. 14 illustrates an example of a case where the output control unit 250 expresses the additional information corresponding to a plurality of users using a single circle. FIGS. 3 and 7 illustrate examples where the output control unit 250 expresses the additional information corresponding to the plurality of users using a plurality of independent circles. Meanwhile, as illustrated in FIG. 14, the output control unit 250 can also express the additional information corresponding to a plurality of users using a single circle.

For example, in the case of the example illustrated on the left in FIG. 14, the output control unit 250 express the additional information AI1 and AI2 regarding the detection directions of the users by making a part of the circle thicker. Note that the output control unit 250 may indicate the detection direction by increasing the brightness of a part of the circle.

Figure 15:
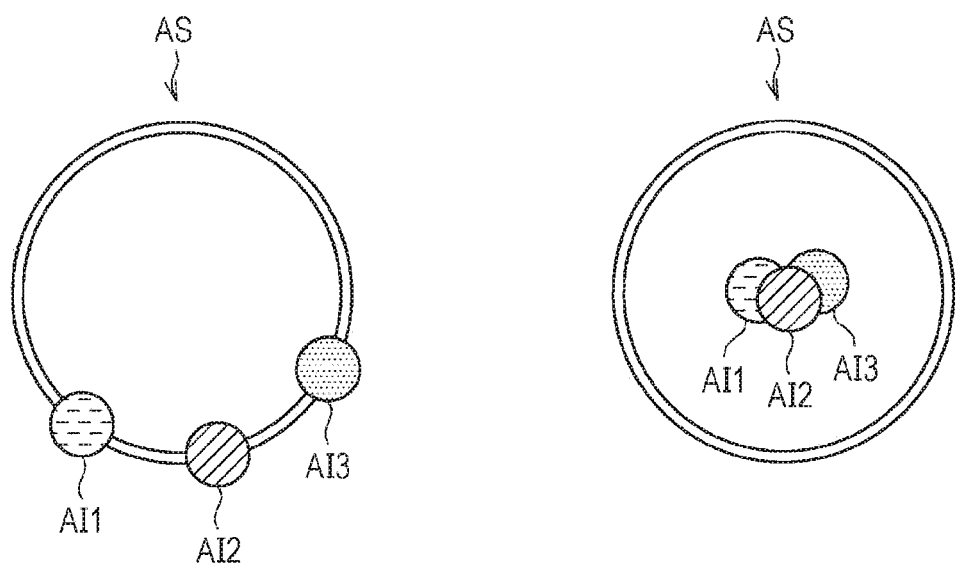
FIG. 15 is a diagram for describing a variation of output expression by the output control unit according to the embodiment.

Furthermore, in the example illustrated on the right in FIG. 14, the output control unit 250 expresses the additional information AI1 to AI3 regarding the identification states of the users by applying patterns respectively corresponding to the users to a part of the circle Furthermore, FIG. 15 illustrates an example of a case where the output control unit 250 expresses the additional information corresponding to users using a plurality of sphere states. FIGS. 3 and 7 illustrate examples of the case where the symbol AS is represented by a single sphere. Meanwhile, the output control unit 250 may perform display control such that the symbol AS has a plurality of spheres respectively corresponding to a plurality of users and express the additional information corresponding to the respective users using the spheres.

For example, in the case of the example illustrated in FIG. 15, the output control unit 250 expresses the additional information AI1 to AI3 respectively corresponding to three users using three spheres. In the example illustrated on the left in FIG. 15, the output control unit 250 expresses the detection directions of the respective users using the positions of the additional information AI1 to AI3 on the circle. In the example illustrated on the right in FIG. 15, the output control unit 250 expresses the detection directions of the respective users by controlling the positions of the additional information AI1 to AI3 at the center of the circle. Furthermore, the output control unit 250 may express the identification state of each user by applying a pattern corresponding to each user to each sphere.

The variations of the output expression by the output control unit 250 according to the present embodiment have been described. As described above, the output control unit 250 according to the present embodiment can express the additional information such as the session state, the detection direction of the user, and the identification state of the user, using various modals such as the latitude, pattern, shape, brightness, and behavior.

Furthermore, the output control unit 250 may express the above-described additional information, using a light source such as an LED included in the information processing terminal 10, for example. For example, in a case where the call to the agent is not performed for a predetermined time or more, the output control unit 250 can perform display control to store the symbol corresponding to the agent function from the display area to the information processing terminal 10. At this time, even in a case where the symbol is stored in the information processing terminal 10, the output control unit 250 can express the detection direction and the identification state of the user, and the like, using the light source provided on an exterior of the information processing terminal 10.

Furthermore, the output control unit 250 may express various states including an emotion of the agent as one of the pieces of additional information. At this time, the output control unit 250 can express the state of the agent in a various manner using the above-described various modals.

<<1.6. Flow of Operation>>

Next, a flow of operation of the information processing server 20 according to the present embodiment will be described in detail. Next, a basic flow of output control by the information processing server 20 according to the present embodiment will be described.

Figure 16:
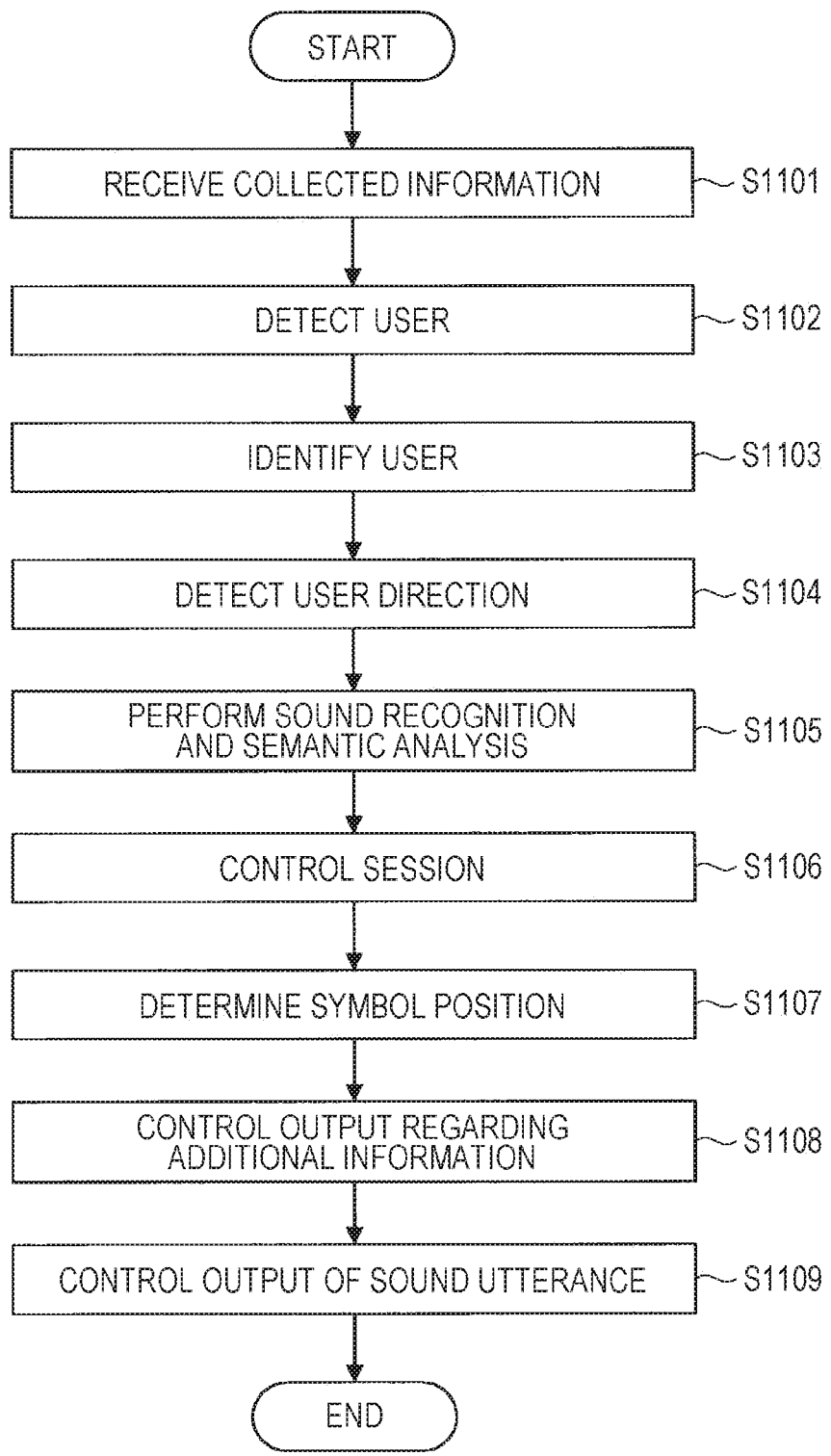
FIG. 16 is a flowchart illustrating a flow of output control by the information processing server according to the embodiment.

FIG. 16 is a flowchart illustrating a flow of the output control by the information processing server 20 according to the present embodiment. Referring to FIG. 16, first, the terminal communication unit 280 receives collected information collected by the information processing terminal 10 (S1101). The above collected information includes the sound information, image information, and sensor information.

Next, the user recognition unit 230 detects the user on the basis of the collected information received in step S1101 (S1102). The user recognition unit 230 can detect the user on the basis of, for example, human detection based on the image information, the sensor information collected by the human sensor, and the like.

Next, the user recognition unit 230 identifies the user on the basis of the collected information received in step S1101 (S1103). The user recognition unit 230 may identify the user by, for example, face recognition based on the image information or speaker recognition based on the sound information.

Next, the user state estimation unit 240 acquires the detection direction of the user detected in step S1102 (S1104). The user state estimation unit 240 can acquire the detection direction of the user on the basis of, for example, the image information in which the user is captured and the sound information including utterances of the user acquired by the plurality of microphones.

Next, the sound recognition unit 210 executes the sound recognition processing based on the sound information received in step S1101, and the semantic analysis unit 220 performs a semantic analysis based on the result of the sound recognition processing (S1105).

Here, in a case where the utterance of the user recognized in step S1105 includes the activation word, the output control unit 250 performs control to open a session for the user who has uttered the activation word (S1106).

Next, the output control unit 250 determines the display position of the symbol on the basis of the detection direction of the user acquired in step S1104 (S1107) and the like.

Next, the output control unit 250 performs output control regarding the additional information such as the user detection direction acquired in step S1104, the user identification state acquired in step S1103, and the session state (S1108).

Furthermore, the output control unit 250 executes output control of, for example, a sound utterance according to the user's utterance intention analyzed in step S1105 (S1109).

Figure 17:
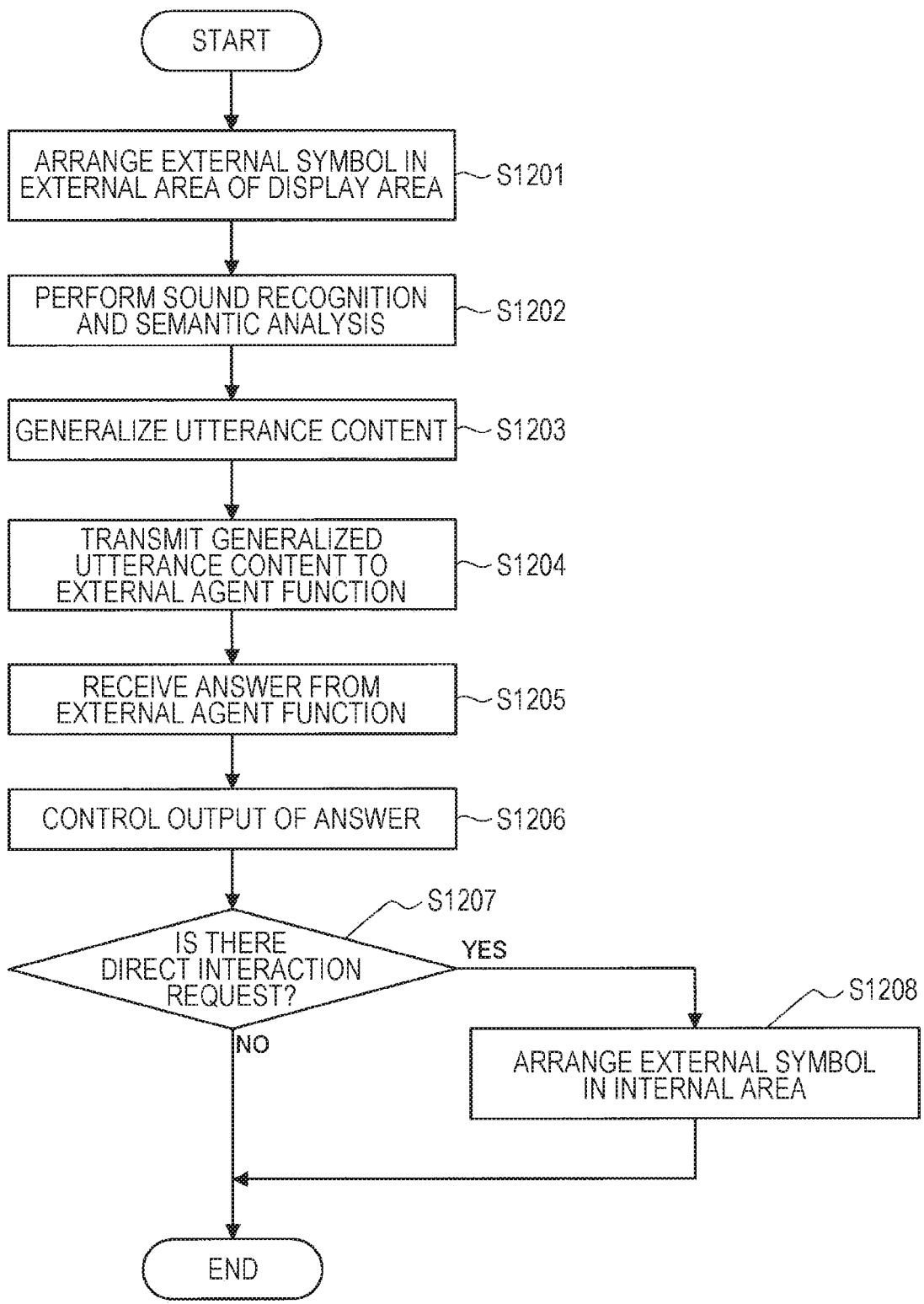
FIG. 17 is a flowchart illustrating a flow of external symbol display control according to the embodiment.

Next, a flow of display control of the external symbol according to the present embodiment will be described in detail. FIG. 17 is a flowchart illustrating a flow of display control of the external symbol according to the present embodiment.

Referring to FIG. 17, first, the output control unit 250 performs control such that the external symbol is displayed in the external area set in the display area (S1201).

Next, the sound recognition unit 210 executes the sound recognition processing based on the collected sound information regarding the utterance of the user, and the semantic analysis unit 220 performs a semantic analysis based on the result of the sound recognition processing (S1202).

Next, the output control unit 250 generalizes the utterance content of the user analyzed in step S1202 and generates the delivery information (S1203).

Next, the output control unit 250 transmits the delivery information generated in step S1203 to the external agent function (S1204).

Next, the output control unit 250 receives an answer corresponding to the delivery information transmitted in step S1204 from the external agent function (S1205).

Next, the output control unit 250 performs output control regarding the answer received in step S1205 (S1207).

Here, in the case where there is the request regarding direct interaction with the external agent function from the user (S1207: Yes), the output control unit 250 moves the external symbol to the internal area set in the display area and allows the direct interaction between the user and the external agent function (S1208).

Meanwhile, in the case where no request regarding direct interaction with the external agent function is detected (S1207: No), the output control unit 250 returns to the standby state.

<<2. Hardware Configuration Example>>

Figure 18:
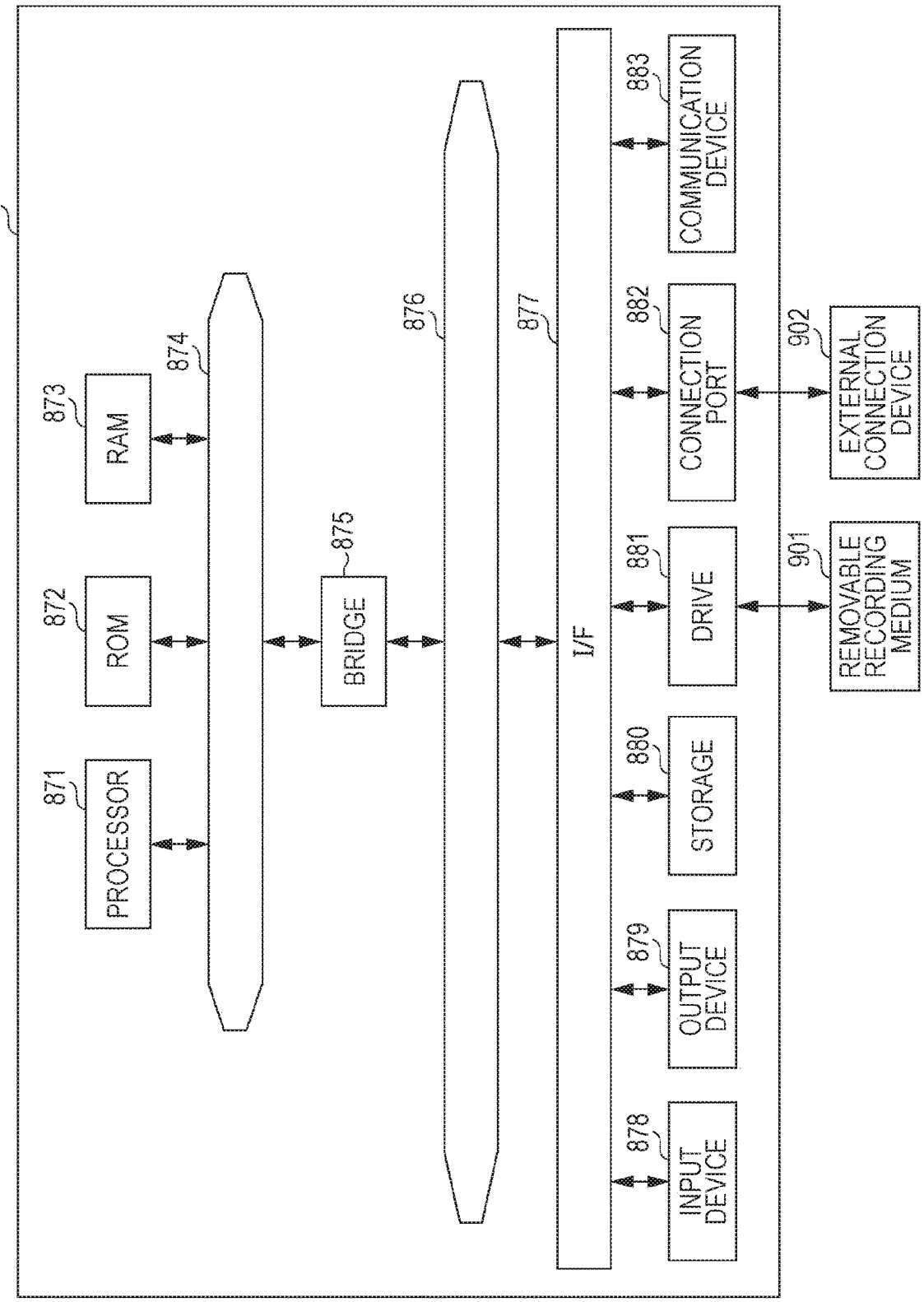
FIG. 18 is a diagram illustrating a hardware configuration example according to the embodiment of the present disclosure.

Next, a hardware configuration example common to the information processing terminal 10 and the information processing server 20 according to the embodiment of the present disclosure will be described. FIG. 18 is a block diagram illustrating a hardware configuration example of the information processing terminal 10 and the information processing server 20 according to the embodiment of the present disclosure. Referring to FIG. 18, the information processing terminal 10 and the information processing server 20 include, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration illustrated here is an example, and some of the configuration elements may be omitted. Furthermore, a configuration element other than the configuration elements illustrated here may be further included.

(Processor 871)

The processor 871 functions as, for example, an arithmetic processing unit or a control unit, and controls the overall operation or a part thereof of the configuration elements on the basis of various programs recorded in the ROM 872, RAM 873, storage 880, or removable recording medium 901.

(ROM 872 and RAM 873)

The ROM 872 is a means for storing a program read by the processor 871, data used for calculation, and the like. The RAM 873 temporarily or permanently stores, for example, a program read by the processor 871, various parameters that change as appropriate when the program is executed, and the like.

(Host Bus 874, Bridge 875, External Bus 876, and Interface 877)

The processor 871, the ROM 872, and the RAM 873 are connected to one another via, for example, the host bus 874 capable of high-speed data transmission. Meanwhile, the host bus 874 is connected to the external bus 876 having a relatively low data transmission speed via the bridge 875, for example. Furthermore, the external bus 876 is connected to various configuration elements via the interface 877.

(Output Device 878)

As the input device 878, for example, a mouse, a keyboard, a touch panel, a button, a switch, a lever, and the like are used. Moreover, as the input device 878, a remote controller (hereinafter referred to as a remote controller) capable of transmitting a control signal using infrared rays or other radio waves may be used. Furthermore, the input device 878 includes a sound input device such as a microphone.

(Output Device 879)

The output device 879 is a device that can visually or audibly notify a user of acquired information, such as a display device such as a cathode ray tube (CRT), an LCD, or an organic EL, an audio output device such as a speaker or a headphone, a printer, a mobile phone, or a facsimile, for example. Furthermore, the output device 879 according to the present disclosure includes various vibration devices that can output tactile stimuli.

(Storage 880)

The storage 880 is a device for storing various data. As the storage 880, for example, a magnetic storage device such as a hard disk drive (HDD), a semiconductor storage device, an optical storage device, a magneto-optical storage device, or the like is used.

(Drive 881)

The drive 881 is a device that reads information recorded on the removable recording medium 901 such as a magnetic disk, an optical disk, a magneto-optical disk, or a semiconductor memory, or writes information to the removable recording medium 901, for example.

(Removable Recording Medium 901)

The removable recording medium 901 is, for example, a DVD medium, a Blu-ray (registered trademark) medium, an HD-DVD medium, various semiconductor storage media, or the like. Of course, the removable recording medium 901 may be, for example, an IC card on which a non-contact IC chip is mounted, an electronic device, or the like.

(Connection Port 882)

The connection port 882 is a port for connecting an external connection device 902 such as a universal serial bus (USB) port, an IEEE1394 port, a small computer system interface (SCSI), an RS-232C port, or an optical audio terminal, for example.

(External Connection Device 902)

The external connection device 902 is, for example, a printer, a portable music player, a digital camera, a digital video camera, an IC recorder, or the like.

(Communication Device 883)

The communication device 883 is a communication device for being connected to a network, and is, for example, a communication card for wired or wireless LAN, a Bluetooth (registered trademark), a wireless USB (WUSB), a router for optical communication, an asymmetric digital subscriber line (ADSL) router, one of various communication modems, or the like.

<<3. Conclusion>>

As described above, the information processing server 20 according to the embodiment of the present disclosure includes the output control unit 250 that controls the output based on the result of the recognition processing for the user input. Furthermore, the output control unit 250 according to the embodiment of the present disclosure is characterized in dynamically controlling, for each user, an output of an executability state of the recognition processing for a user input in a situation where a plurality of users is present. According to such a configuration, it is possible to make each of a plurality of users clearly perceive input acceptability.

Although the favorable embodiment of the present disclosure has been described in detail with reference to the accompanying drawings, the technical scope of the present disclosure is not limited to such examples. It is obvious that persons having ordinary knowledge in the technical field of the present disclosure can conceive various modifications or alterations within the scope of the technical idea described in the claims, and the modifications and alterations are naturally understood to belong to the technical scope of the present disclosure.

Furthermore, the effects described in the present specification are merely illustrative or exemplary and are not restrictive. That is, the technology according to the present disclosure can exhibit other effects obvious to those skilled in the art from the description of the present specification together with or in place of the above-described effects.

Furthermore, the steps in the processing of the information processing server 20 of the present specification do not necessarily need be processed chronologically in the order described as the flowcharts. For example, the steps regarding the processing of the information processing server 20 may be processed in an order different from the order described as the flowcharts or may be processed in parallel.

Note that following configurations also belong to the technical scope of the present disclosure.

(1)

An information processing apparatus including:

an output control unit configured to control an output based on a result of recognition processing for a user input, in which, in a situation where a plurality of users is present, the output control unit dynamically controls, for each of the users, an output of an executability state of the recognition processing for the user input.

(2)

The information processing apparatus according to (1), in which the output control unit dynamically controls, for each of the users, an output of information regarding a detection direction of the user.

(3)

The information processing apparatus according to (1) or (2), in which the output control unit dynamically controls, for each of the users, an output of information regarding an identification state of the user.

(4)

The information processing apparatus according to any one of (1) to (3), in which the output control unit dynamically controls, for each of the users, an output of information regarding presence or absence of detection of the user.

(5)

The information processing apparatus according to any one of (1) to (4), in which the recognition processing includes sound recognition processing, and the output control unit dynamically controls, for each of the users, an output of information regarding a session state of the sound recognition processing.

(6)

The information processing apparatus according to (5), in which the output control unit controls display of a symbol on a display area corresponding to an agent function to interact with the user based on the sound recognition processing.

(7)

The information processing apparatus according to (6), in which the output control unit performs display control so that the user is able to simultaneously visually recognize at least one of the session state, a detection direction of the user, or an identification state of the user, and the symbol.

(8)

The information processing apparatus according to (6) or (7), in which the output control unit performs display control so that the user is able to simultaneously visually recognize at least either an execution state of the sound recognition processing or an execution state of response generation processing based on a result of the sound recognition processing, and the symbol.

(9)

The information processing apparatus according to (7), in which the output control unit expresses at least one of the session state, the detection direction of the user, or the identification state of the user by a color, a pattern, a shape, or a change in behavior.

(10)

The information processing apparatus according to any one of (6) to (9), in which the output control unit dynamically controls a display position of the symbol on the basis of a detected position of the user.

(11)

The information processing apparatus according to (10), in which the output control unit performs display control so that the symbol follows a position change of the user.

(12)

The information processing apparatus according to (10) or (11), in which, in a case where the users are having a conversation, the output control unit displays the symbol at a position not disturbing the conversation between the users.

(13)

The information processing apparatus according to any one of (1) to (12), in which the output control unit controls display of an external symbol corresponding to an agent function provided by a third party.

(14)

The information processing apparatus according to (13), in which the output control unit separates an internal area that displays a symbol corresponding to an internal agent function and an external area that displays the external symbol, and performs control so that information regarding an utterance of the user is not transmitted to the external area.

(15)

The information processing apparatus according to (14), in which the output control unit generalizes utterance content of the user and hands over the utterance content to the agent function related to the external symbol.

(16)

The information processing apparatus according to (14) or (15), in which the output control unit moves the external symbol to the internal area on the basis of a request from the user, and performs control so that the user is able to directly interact with the agent function related to the external symbol.

(17)

The information processing apparatus according to any one of (6) to (12), in which the output control unit displays the symbol according to abstract visual information not imitating a living thing.

(18)

The information processing apparatus according to any one of (1) to (17), further including:

a sound recognition unit configured to perform the sound recognition processing for the user input.

(19)

The information processing apparatus according to any one of (1) to (18), further including:

a display unit configured to display, for each of the users, the executability state of the recognition processing on the basis of control by the output control unit.

(20)

An information processing method including:

by a processor, controlling an output based on a result of recognition processing for a user input, the controlling further including, in a situation where a plurality of users is present, dynamically controlling, for each of the users, an output of an executability state of the recognition processing for the user input.

REFERENCE SIGNS LIST

10 Information processing terminal
110 Display unit
120 Sound output unit
130 Sound input unit
140 Imaging unit
150 Sensor unit
160 Control unit
170 Server communication unit
20 Information processing server
210 Sound recognition unit
220 Semantic analysis unit
230 User recognition unit
240 User state estimation unit
250 Output control unit
260 User DB
270 Presentation information DB
280 Terminal communication unit

The invention claimed is:

1. An information processing apparatus, comprising:
an output control unit configured to:
receive a result of a detection processing to detect a plurality of users;
control a first display of a plurality of symbols based on the result of the detection processing, wherein each symbol of the displayed plurality of symbols indicates a corresponding user of the plurality of users; and
control a second display of additional information associated with each symbol of the displayed plurality of symbols, wherein
the additional information indicates a session state between the corresponding user of the plurality of users and a device,
the additional information includes one of a first pattern or a second pattern,
a shape of the first pattern and the second pattern indicates a detection direction of the corresponding user,
the session state includes one of an executability state of a recognition processing or a disconnected state of the recognition processing,
the first pattern is displayed to indicate the executability state, wherein the executability state is a state of the device in which the recognition processing is executable to process an input of the user, and
the second pattern is displayed to indicate the disconnected state, wherein the disconnected state is a state of the device in which the recognition processing is non-executable to process the input of the user.

2. The information processing apparatus according to claim 1, wherein the output control unit is further configured to control, for each user of the plurality of users, the second display of the additional information regarding an identification state of the corresponding user.

3. The information processing apparatus according to claim 1, wherein the output control unit is further configured to control, for each user of the plurality of users, the second display of the additional information regarding at least one of presence or absence of detection of the corresponding user.

4. The information processing apparatus according to claim 1, wherein
the recognition processing includes sound recognition processing, and
the output control unit is further configured to control, for each user of the plurality of users, the second display of the additional information regarding the session state of the sound recognition processing.

5. The information processing apparatus according to claim 4, wherein
the output control unit is further configured to control the first display of at least one symbol of the plurality of symbols on a display area corresponding to an agent function, and
the agent function is a function to interact with at least one user of the plurality of users based on the sound recognition processing.

6. The information processing apparatus according to claim 5, wherein the output control unit is further configured to perform display control such that the at least one user of the plurality of users simultaneously visually recognizes the at least one symbol and at least one of the session state, a detection direction of the at least one user, or an identification state of the at least one user.

7. The information processing apparatus according to claim 5, wherein the output control unit is further configured to perform display control such that the at least one user simultaneously visually recognizes the at least one symbol and at least one of the executability state of the sound recognition processing or an execution state of a response generation processing based on a result of the sound recognition processing.

8. The information processing apparatus according to claim 6, wherein the output control unit is further configured to represent at least one of the session state, the detection direction of the at least one user, or the identification state of the at least one user by at least one of a color, a pattern, a shape, or a change in behavior of the at least one symbol.

9. The information processing apparatus according to claim 5, wherein the output control unit is further configured to control a display position of the at least one symbol based on a detected position of the at least one user corresponding to the at least one symbol.

10. The information processing apparatus according to claim 9, wherein the output control unit is further configured to perform display control such that the at least one symbol follows a position change of the at least one user.

11. The information processing apparatus according to claim 9, wherein, in a case where a conversation between at least two users of the plurality of users is detected, the output control unit is further configured to control the first display of at least two symbols of the plurality of symbols corresponding to the at least two users at a display position above heads of the at least two users such that the display position of each of the at least two symbols is not disturbing conversation between the at least two users.

12. The information processing apparatus according to claim 1, wherein the output control unit is further configured to control a third display of an external symbol corresponding to an agent function associated with a third party.

13. The information processing apparatus according to claim 12, wherein the output control unit is further configured to:
separate a display area for the plurality of symbols with a display area of the external symbol, and
restrict transmission of information regarding an utterance of at least one user of the plurality of users to the display area of the external symbol.

14. The information processing apparatus according to claim 13, wherein the output control unit is further configured to:
generalize utterance content of the at least one user; and
transmit the generalized utterance content to the agent function related to the external symbol.

15. The information processing apparatus according to claim 13, wherein the output control unit is further configured to:
move the external symbol to the display area of the plurality of symbols based on a request from the at least one user; and
control direct interaction of the at least one user with the agent function related to the external symbol based on the movement of the external symbol to the display area of the plurality of symbols.

16. The information processing apparatus according to claim 5, wherein
the output control unit is further configured to control the first display of the at least one symbol according to abstract visual information, and the at least one symbol according to the abstract visual information is different from an imitation of a living thing.

17. The information processing apparatus according to claim 1, wherein
the recognition processing includes sound recognition processing, and
the information processing apparatus further comprises a sound recognition unit configured to perform the sound recognition processing for the user input of the corresponding user.

18. The information processing apparatus according to claim 1, further comprising a display unit, wherein the output control unit is further configured to control the display unit to display, for each of the plurality of users, the executability state of the recognition processing.

19. An information processing method, comprising:
receiving a result of a detection processing to detect a plurality of users;
controlling a first display of a plurality of symbols based on the result of the detection processing, wherein each symbol of the displayed plurality of symbols indicates a corresponding user of the plurality of users; and
controlling a second display of additional information associated with each symbol of the displayed plurality of symbols, wherein
the additional information indicates a session state between the corresponding user of the plurality of users and a device,
the additional information includes a first pattern or a second pattern,
a shape of one of the first pattern or the second pattern indicates a detection direction of the corresponding user,
the session state includes one of an executability state of a recognition processing or a disconnected state of the recognition processing,
the first pattern is displayed to indicate the executability state, wherein the executability state is a state of the device in which the recognition processing is executable to process an input of the user, and
the second pattern is displayed to indicate the disconnected state, wherein the disconnected state is a state of the device in which the recognition processing is non-executable to process the input of the user.

* * * * *